(12) United States Patent
Doujou

(10) Patent No.: US 12,405,446 B2
(45) Date of Patent: Sep. 2, 2025

(54) OPTICAL SYSTEM AND IMAGE PICKUP APPARATUS HAVING THE SAME

(71) Applicant: CANON KABUSHIKI KAISHA, Tokyo (JP)

(72) Inventor: Naoto Doujou, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 18/368,603

(22) Filed: Sep. 15, 2023

(65) Prior Publication Data

US 2024/0012222 A1 Jan. 11, 2024

Related U.S. Application Data

(62) Division of application No. 17/341,424, filed on Jun. 8, 2021, now abandoned.

(30) Foreign Application Priority Data

Jun. 23, 2020 (JP) ................. 2020-108208

(51) Int. Cl.
*G02B 9/12* (2006.01)
*G02B 5/00* (2006.01)
*G02B 9/06* (2006.01)
*H04N 23/23* (2023.01)

(52) U.S. Cl.
CPC ............... *G02B 9/12* (2013.01); *G02B 5/005* (2013.01); *G02B 9/06* (2013.01); *H04N 23/23* (2023.01)

(58) Field of Classification Search
CPC . G02B 9/12; G02B 5/005; G02B 9/06; G02B 13/008; G02B 13/14; G02B 13/146; H04N 5/33; H04N 23/20; H04N 23/21; H04N 23/23; H04N 25/20; H04N 25/21
USPC ................. 359/355, 356, 357, 350
See application file for complete search history.

(56) References Cited

U.S. PATENT DOCUMENTS

| 5,446,581 | A | 8/1995 | Jamieson |
| 10,634,872 | B2 | 4/2020 | Doujou |
| 2015/0301317 | A1* | 10/2015 | Watanabe ......... G02B 27/4211 359/356 |

(Continued)

FOREIGN PATENT DOCUMENTS

| JP | H10-301024 A | 11/1998 |
| JP | 2012-037697 A | 2/2012 |

(Continued)

OTHER PUBLICATIONS

Notice of Reasons for Refusal issued by the Japanese Patent Office on Jan. 30, 2024 in corresponding JP Patent Application No. 2020-108208, with English translation.

*Primary Examiner* — Marin Pichler
(74) *Attorney, Agent, or Firm* — Carter, DeLuca & Farrell LLP

(57) ABSTRACT

An optical system images an object with light with a wavelength of 8 μm or higher, and includes a diaphragm and an optical element having an aspherical surface and disposed at a position different from that of the diaphragm. In a section including an optical axis, a thickness of an optical element monotonously increases from an on-axis to an outermost off-axis or the optical element is the thinnest at a position other than an on-axis and an outermost off-axis. A predetermined condition is satisfied.

15 Claims, 13 Drawing Sheets

(56) References Cited

U.S. PATENT DOCUMENTS

| | | | |
|---|---|---|---|
| 2018/0267276 A1* | 9/2018 | Kuiseko | G02B 13/003 |
| 2018/0372992 A1 | 12/2018 | Doujou | |
| 2019/0154976 A1 | 5/2019 | Tsai | |
| 2023/0408796 A1 | 12/2023 | Doujou | |

FOREIGN PATENT DOCUMENTS

| | | |
|---|---|---|
| JP | 2013-225019 A | 10/2013 |
| JP | 2014-002182 A | 1/2014 |
| JP | 2019-008271 A | 1/2019 |
| WO | 2018/163831 A1 | 9/2018 |

* cited by examiner

OPTICAL SYSTEM AND IMAGE PICKUP APPARATUS HAVING THE SAME

This application is a divisional of U.S. patent application Ser. No. 17/341,424, filed on Jun. 8, 2021, which claims the benefit of and priority to Japanese Patent Application No. 2020-108208, filed on Jun. 23, 2020, each of which is hereby incorporated by reference herein in their entirety.

BACKGROUND OF THE INVENTION

Field of the Invention

The present invention relates to an optical system compatible with infrared light, for example, one suitable for an image pickup apparatus such as a surveillance camera and an in-vehicle camera.

Description of the Related Art

There is known an optical system ("infrared optical system") compatible with light in an infrared range (infrared light, infrared ray) (with a wavelength of about 8 μm to 14 μm). Applying the infrared optical system to the image pickup apparatus can visualize thermal information such as a temperature distribution of an object, which is unavailable in the visible wavelength range (with a wavelength of about 0.4 μm to 0.7 μm). Materials ("infrared materials") that transmit light in the infrared range used for the infrared optical systems include, for example, germanium (Ge), gallium arsenide (GAAS), chalcogenide, zinc selenide (ZnSe), zinc sulfide (ZnS), silicon (Si) and resin (high density polyethylene, etc.) and the like. The infrared optical system is demanded for high optical performance (resolution) in order to detect weak thermal information of a distant object. Japanese Patent Laid-Open No. ("JP") 10-301024 discloses an infrared optical system having an aspherical surface for correcting various aberrations.

In order to process germanium or silicon into an aspherical shape, difficult processes such as grinding and polishing are required. The optical system disclosed in JP 10-301024 uses a flat lens made of thin flat silicon in order to reduce aspherical processing difficulty, but is silent about a shape of the flat lens so as to obtain the high optical performance. The infrared materials other than germanium and silicon can provide an aspherical surface by molding, which is less difficult than grinding or polishing. However, this moldable infrared material has a large dispersion, and it is thus necessary to properly set the focal lengths of the overall system and each lens in order to obtain the high optical performance.

SUMMARY OF THE INVENTION

The present invention provides an optical system that is easy to manufacture and has high optical performance in an infrared range, and an image pickup apparatus having the same.

An optical system according to one aspect of the present invention images an object with light with a wavelength of 8 μm or longer, and includes an optical element having an aspherical surface and disposed at a position different from that of a diaphragm. In a section including an optical axis, a thickness of an optical element monotonously increases from an on-axis to an outermost off-axis or the optical element is the thinnest at a position other than an on-axis and an outermost off-axis (between an on-axis and an outermost off-axis not inclusive). The following conditional expression is satisfied:

$$0.0<|f/Pf1|<0.3$$

where f is a focal length of the optical system, and Pf1 is a focal length of the optical element. Alternatively, the following conditional expressions are satisfied:

$$20 \leq (N10-1)/(N8-N12) \leq 800$$

$$0.0<|f/Pf2|<0.3$$

where N8 is a refractive index of a material of an optical element at a wavelength of 8 μm, N10 is a refractive index of the material at a wavelength of 10 μm, N12 is a refractive index of the material at a wavelength of 12 μm, f is a focal length of the optical system, and Pf2 is a focal length of the optical element.

An image pickup apparatus that includes the above optical system also constitutes another aspect of the present invention.

Further features of the present invention will become apparent from the following description of exemplary embodiments with reference to the attached drawings.

DESCRIPTION OF THE EMBODIMENTS

Figure 1:
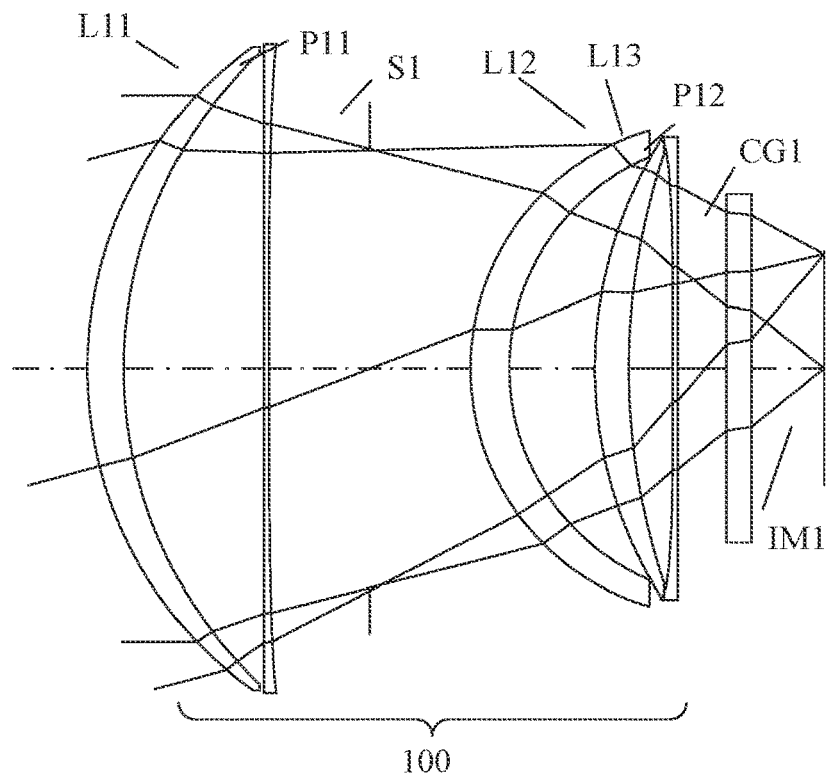
FIG. 1 is a sectional view of an optical system according to Example 1.

Referring now to the accompanying drawings, a detailed description will be given of embodiments according to the present invention. Corresponding elements in respective figures will be designated by the same reference numerals, and a duplicate description thereof will be omitted.

A silicon material or a germanium material in the description of each example means a material containing silicon or germanium as a main component, and is not limited to a material exclusively consisting of silicon (Si) or germanium (Ge) but may contain a small amount of impurities.

Example 1

FIG. 1 is a sectional view of an optical system 100 according to this example. The optical system 100 is an infrared optical system having a focal length of 18 mm and an F-number of 0.8. The infrared optical system, as used herein, is an optical system that images an object with light having a wavelength of 8 µm or longer. The optical system 100 includes, in order from the object side to the image side, a first lens L11 having a positive refractive power and made of a silicon material, a thin aspherical plate (optical element) P11 made of a silicon material and having an aspherical portion with a thickness that gradually increases from the center to the periphery (or with a thickness that monotonously increases from the on-axis to the outermost off-axis in the section including the optical axis), a diaphragm (aperture stop) S1, a second lens L12 having a positive refractive power and made of a silicon material, a third lens L13 having a positive refractive power and made of a silicon material, and a thin aspherical plate (optical element) P12 made of a silicon material and having an aspherical portion with a thickness that gradually increases from the center to the periphery. The thin aspherical plates P11 and P12 are assumed to have a very thin thickness of several hundred µm. Therefore, it can be manufactured by easy processing such as processing used to manufacture a Schmidt correction plate. Light in the infrared range (with a wavelength 8 to 14 µm) guided by the optical system 100 passes through a cover glass CG1 and forms an image on an infrared sensor IM1. A window material may be provided between the first lens L11 and the object, or the cover glass CG1 may include an infrared material other than the germanium material. Table 1 shows numerical data of the optical system 100. The unit of radius of curvature and spacing (distance or interval) is mm

TABLE 1

| | | RADIUS OF CURVATURE | SPACING | GLASS MATERIAL |
|---|---|---|---|---|
| OBJECT PLANE | | — | INFINITY | |
| L11 | SPHERICAL SURFACE | 16.30 | 1.50 | SILICON |
| | SPHERICAL SURFACE | 17.91 | 5.76 | |
| | FLAT SURFACE | FLAT SURFACE | 0.20 | SILICON |
| | ASPHERICAL SURFACE 11 | 1.00E+16 | 4.16 | |
| S2 | FLAT SURFACE | — | 4.10 | |
| L12 | SPHERICAL SURFACE | 10.19 | 1.60 | SILICON |
| | SPHERICAL SURFACE | 9.44 | 3.52 | |
| L13 | SPHERICAL SURFACE | 17.60 | 1.40 | SILICON |
| | SPHERICAL SURFACE | 27.55 | 1.82 | |
| P2 | ASPHERICAL SURFACE 12 | 1.00E+16 | 0.20 | SILICON |
| | FLAT SURFACE | FLAT SURFACE | 2.00 | |
| CG1 | FLAT SURFACE | FLAT SURFACE | 1.00 | GERMANIUM |
| | FLAT SURFACE | FLAT SURFACE | 3.60 | |
| IMAGE PLANE | | | | |

Table 2 shows aspherical shape data.

TABLE 2

| | ASPHERICAL SURFACE 11 | ASPHERICAL SURFACE 12 |
|---|---|---|
| PARAXIAL RADIUS OF CURVATURE R | 1.00E+16 | 1.00E+16 |
| CONICAL COEFFICIENT k | 0.00 | 0.00 |
| 4TH-ORDER COEFFICIENT A | 1.15E–05 | –3.67E–05 |
| 6TH-ORDER COEFFICIENT B | –7.80E–08 | 1.24E–07 |
| 8TH-ORDER COEFFICIENT C | 1.20E–09 | 7.32E–09 |
| 10TH-ORDER COEFFICIENT D | –1.07E–11 | –6.89E–10 |
| 12TH-ORDER COEFFICIENT E | 4.02E–14 | 1.36E–11 |
| 14TH-ORDER COEFFICIENT F | –3.76E–17 | –8.20E–14 |

The aspherical shape is expressed as follows:

$$Z = \frac{(1/R)h^2}{1+\sqrt{1-(1+k)(1/R)^2 h^2}} + Ah^4 + Bh^6 + Ch^8 + Dh^{10} + Eh^{12} + Fh^{14} \quad (1)$$

where Z is a displacement amount from a surface apex in an optical axis direction, h is a height from an optical axis in a direction orthogonal to the optical axis, R is a paraxial radius of curvature, k is a conical coefficient, and A to F are fourth to fourteenth order aspherical coefficients.

Figure 2:
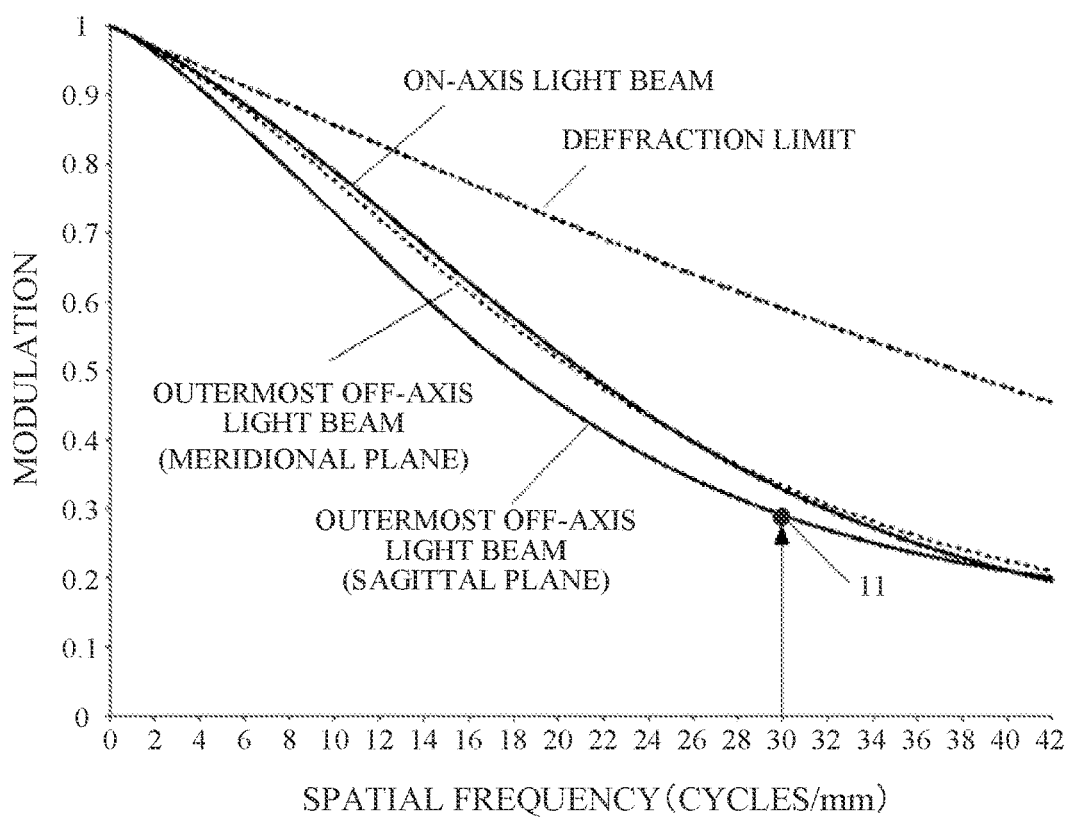
FIG. 2 is an MTF diagram of the optical system according to Example 1.

FIG. 2 is an MTF diagram of the optical system 100. A pixel pitch of a general infrared sensor is several tens of µm. This example uses the infrared sensor IM1 having a pixel pitch of 17 µm by an implementation. In this case, the Nyquist frequency is about 30 lp/mm. In order to resolve the object at this Nyquist frequency, the MTF value of about 30% is empirically sufficient. The MTF value at the Nyquist frequency in this example represented by reference numeral 11 in FIG. 2 is 28%. Since the MTF value is about 30% at the Nyquist frequency of the infrared sensor IM1, the optical system 100 exhibits excellent optical performance.

The silicon material has a high refractive index and a low dispersion in the infrared range, and can provide high optical performance with an aspherical surface as part of the lens made of the silicon material. In order to process an optical element having an aspherical surface of a silicon material, a highly difficult process such as grinding or polishing is required. Accordingly, a thin aspherical plate is useful in which it is easy to process an aspherical portion without any highly difficult processes such as grinding or polishing. The thin aspherical plate can be manufactured by a photolithography process and a process for the Schmidt correction plate, which is manufactured by adsorbing an aspherical prototype on a thin lens substrate, by transferring the shape of the aspherical prototype, and by polishing it.

Table 3 shows a refractive index N10 and an Abbe number v10 of a material that transmits infrared light. The refractive index N10 is a refractive index at a wavelength of 10 μm. The Abbe number v10 is expressed by the following expression (2) where N8 is a refractive index of the material at a wavelength of 8 μm and N12 is a refractive index of the material at a wavelength of 12 μm. In general, the larger the Abbe number is, the smaller the refractive index change (dispersion) becomes due to the wavelength. Since numerical values are slightly different depending on each glass material manufacturer, Table 3 shows approximate numerical values. In particular, the refractive index and Abbe number of chalcogenides vary greatly depending on the type of compound using the oxygen group element of Group 16 in the periodic table. Depending on the type of compound, the refractive index N10 varies from 2.0 to 4.0 and the Abbe number v10 varies from 100 to 800.

A lens usually has a positive Abbe number, and thus at least one lens may have a negative focal length in order to reduce the chromatic aberration. Therefore, the optical system for correcting the chromatic aberration has a combination of a positive lens and a negative lens. Since the silicon lens has a very small dispersion, the chromatic aberration is small even with the silicon lens having a positive refractive power alone, but there may be an element that plays a role of a negative lens. In this example, the thin aspherical plate has an aspherical portion with a thickness that gradually increases from the center to the periphery, so that the chromatic aberration can be corrected with high accuracy. An optical system having a short focal length needs to converge light beams with a plurality of angles of view, so that the first lens may be a negative lens.

In order to correct the curvature of field, the optical system needs to satisfy the following expression (4) so as to reduce the Petzval sum. Since the Petzval sum correlates with the curvature of field, the curvature of field can be reduced by reducing the Petzval sum. In the expression (4), f1, f2, f3, . . . , and fn are focal lengths of the first lens, the second lens, the third lens, . . . , and the n-th lens, respectively, and N1, N2, N3, . . . , and Nn are refractive indexes of the first lens, the second lens, the third lens, . . . , and the n-th lens, respectively.

$$\frac{1}{f1N1} + \frac{1}{f2N2} + \frac{1}{f3N3} + \cdots + \frac{1}{fnNn} = 0 \quad (4)$$

A lens usually has a positive refractive index, and thus at least one lens may have a negative focal length in order to reduce the Petzval sum. Therefore, the optical system for correcting a curvature of field has a combination of a positive lens and a negative lens. Since a silicon lens has a very large refractive index, the Petzval sum can be reduced only by the silicon lens having a positive refractive power,

TABLE 3

| | GERMANIUM | SILICON | RESIN | CALCOGENIDE | ZINC SULFIDE | ZINC SELENIDE |
|---|---|---|---|---|---|---|
| REFRACTIVE INDEX N10 | 4.0 | 3.4 | 1.5 | 2.5 | 2.2 | 2.4 |
| DISPERSION VALUE v 10 | 861 | 1860 | 45 | 109 | 23 | 57 |

$$v10 = \frac{N10 - 1}{N8 - N12} \quad (2)$$

Germanium and silicon each have a higher refractive index and a smaller dispersion than other materials. A general N-unit optical system has a configuration that satisfies the following expression (3) in order to correct the chromatic aberration. In the expression (3), f1, f2, f3, . . . , and fn are focal lengths of a first lens, a second lens, a third lens, . . . , and an n-th lens, respectively, and v1, v2, v3, . . . , and vn are Abbe numbers of the first lens, the second lens, the third lens, . . . , and the n-th lens, respectively.

$$\frac{1}{f1v1} + \frac{1}{f2v2} + \frac{1}{f3v3} + \cdots + \frac{1}{fnvn} = 0 \quad (3)$$

but there may be an element that plays a role of a negative lens. In this example, the Petzval sum can be corrected with high accuracy by the thin aspherical plate having an aspherical portion with a thickness that gradually increases from the center to the periphery. An optical system having a short focal length needs to converge light beams with a plurality of angles of view, so that the first lens may be a negative lens.

For high optical performance, it is important to correct a spherical aberration with high accuracy that is proportional to the pupil diameter of the lens. It is useful to share the spherical aberration with each lens and to correct it. In each example, the spherical lens having the main refractive power may be a positive lens. Thereby, the light beams can be gently converged, and the spherical aberration can be suppressed. An optical system having a short focal length needs to converge light beams with a plurality of angles of view, so that the first lens may be a negative lens.

A bright F-number lens such as an infrared lens needs to correct a high-order curvature of field with high accuracy in order to obtain excellent imaging performance. Accordingly, the present invention places the thin aspherical plate P11 at a position different from that of the diaphragm S1, and causes the aspherical portion of the thin aspherical plate P11 to correct the higher-order curvature of field. Each example places the thin aspherical plate P12 having a small refractive power at a position close to the diaphragm S1 on the object side or the image side of the diaphragm S1 and corrects a higher-order curvature of field and spherical aberration. That is, the conditions for Petzval sum and chromatic aberration correction are shared with spherical lenses having main refractive powers, and a thin aspherical plate having a small refractive power corrects a higher-order spherical aberration and a higher-order curvature of field. It is particularly difficult to correct the high-order curvature of field only with a spherical lens, and thus a thin aspherical plate may be disposed at a position where the on-axis ray and the off-axis ray are separated. Due to this configuration, the optical system 100 can exhibit high optical performance.

Compared to other spherical lenses, the focal length of the thin aspherical plate gives only the action of the aspherical portion as an effect, so it is unnecessary to have a high refractive power. Therefore, the optical systems according to Examples 1 to 8 satisfy the following conditional expression (5):

$$0.0 < |f/Pf1| < 0.3 \quad (5)$$

where f is a focal length of the optical system and Pf1 is a focal length of the thin aspherical plate.

The numerical range of the conditional expression (5) may be set to that of the following conditional expression (5a):

$$0.00 < |f/Pf1| < 0.25 \quad (5a)$$

As described above, the configuration according to this example can realize an optical system that is easy to manufacture and has high optical performance in the infrared range.

In the optical systems according to Examples 1 to 8, the thin aspherical plate may have a thin shape from the viewpoint of the transmittance of the silicon material. Hence, the following conditional expression (6) may be satisfied:

$$0.05 < T < 1.00 \quad (6)$$

where T [mm] is a central thickness (thickness on the optical axis).

If the center thickness T is located out of the range of the conditional expression (6), the transmittance may be significantly reduced and the optical performance may be deteriorated.

The numerical range of the conditional expression (6) may be set to that of the following conditional expression (6a):

$$0.05 \leq T \leq 0.60 \quad (6a)$$

The optical systems according to Examples 1 to 4 may satisfy at least of the following conditional expressions (7) to (9):

$$0.1 < |f1/f| < 6.0 \quad (7)$$

$$0.1 < f2/f < 20.0 \quad (8)$$

$$0.1 < f3/f < 5.0 \quad (9)$$

where f1, f2, and f3 are focal lengths of the first to third lenses L11, L12, and L13, respectively.

The conditional expressions (7) to (9) are set to the optical systems according to Examples 1 to 4 so as to satisfactorily correct various aberrations such as the chromatic aberration, the spherical aberration, and the curvature of field and to exhibit high optical performance. If the value is higher than the upper limit or lower than the lower limit in each of the conditional expressions (7) to (9), a correction balance between the curvature of field and the spherical aberration destroys, and the optical performance deteriorates.

The numerical ranges of the conditional expressions (7) to (9) may be set to those of the following conditional expressions (7a) to (9a):

$$0.1 < |f1/f| < 5.0 \quad (7a)$$

$$0.5 < f2/f < 15.0 \quad (8a)$$

$$0.1 < f3/f < 4.0 \quad (9a)$$

Table 4 shows numerical values corresponding to the conditional expressions according to Examples 1 to 4.

TABLE 4

|  | f | f1 | f2 | f3 | Pf1 | Pf2 | f1/f | f2/f | f3/f | f/Pf1 | f/Pf2 |
|---|---|---|---|---|---|---|---|---|---|---|---|
| EX. 1 | 16 | 45.3 | 104.7 | 18.3 | 0 | 0 | 2.52 | 5.82 | 1.02 | — | — |
| EX. 2 | 14 | 57.5 | 147.6 | 13.2 | 0 | 0 | 4.11 | 10.54 | 0.95 | — | — |
| EX. 3 | 50 | 70.6 | 59.7 | — | 0 | 0 | 1.41 | 1.19 | — | — | — |
| EX. 4 | 6 | −14.16 | 11.3 | 15.08 | 51.7 | 49.6 | −2.36 | 1.88 | 2.51 | 0.011805 | 0.012097 |

Example 2

Figure 3:
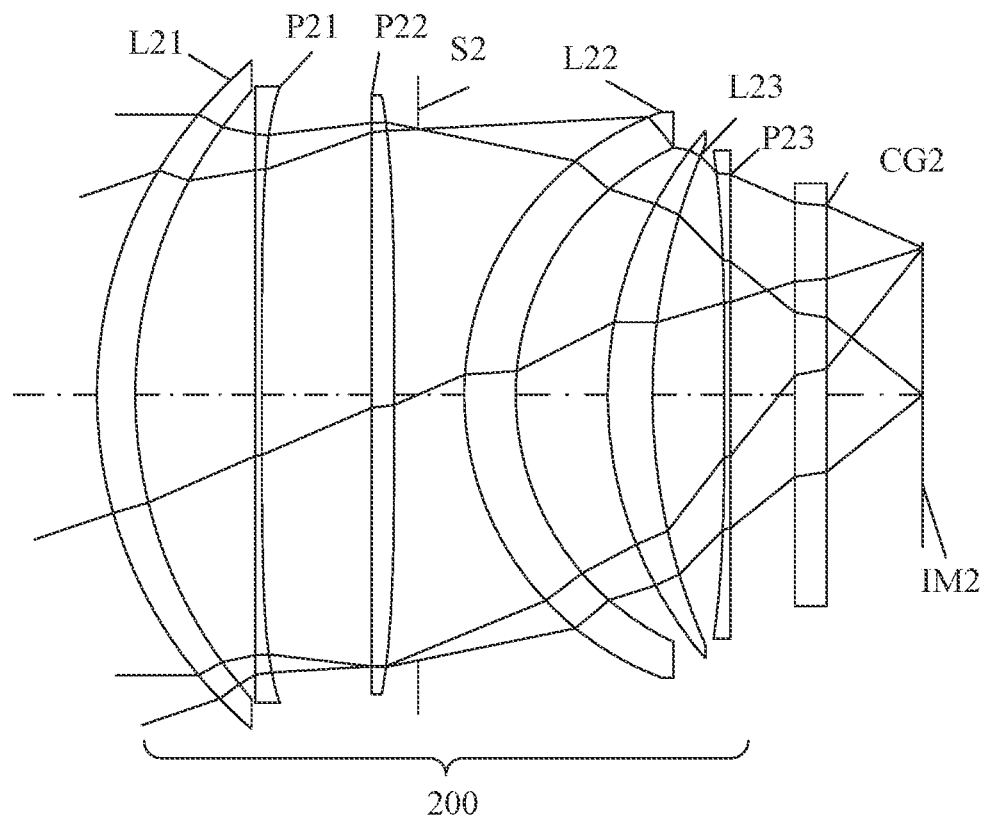
FIG. 3 is a sectional view of an optical system according to Example 2.

FIG. 3 is a sectional view of an optical system 200 according to this example. The optical system 200 is an infrared optical system having a focal length of 14 mm and an F-number of 0.8. The optical system 200 includes, in order from the object side to the image side, a first lens L21 having a positive refractive power and made of a silicon material, a thin aspherical plate P21 made of a silicon material and having an aspherical portion with a thickness that gradually increases from the center to the periphery, a thin aspherical plate P22 made of a silicon material and having an aspherical portion with a thickness that gradually decreases from the center to the periphery, a diaphragm S2, a second lens L22 having a positive refractive power and made of a silicon material, a thin lens L23 having a positive refractive power and made of a silicon material, and a thin aspherical plate P23 made of a silicon material and having an aspherical portion with a thickness that gradually increases from the center to the periphery. The thin aspherical plates P21, P22, and P23 are assumed to have a very thin thickness of several hundred μm. Therefore, each of them can be manufactured by easy processing such as processing used to manufacture the Schmidt correction plate. This example disposes a thin aspherical plate P22 in order to correct a high-order spherical aberration. The light in the infrared range guided by the optical system 200 passes through a cover glass CG2 and forms an image on an infrared sensor IM2. Table 5 shows numerical data of the optical system 200. The unit of radius of curvature and spacing is mm.

TABLE 5

| | | RADIUS OF CURVATURE | SPACING | GLASS MATERIAL |
|---|---|---|---|---|
| OBJECT PLANE | | — | INFINITY | |
| L21 | SPHERICAL SURFACE | 16.30 | 1.20 | SILICON |
| | SPHERICAL SURFACE | 17.91 | 3.74 | |
| P21 | FLAT SURFACE | FLAT SURFACE | 0.20 | SILICON |
| | ASPHERICAL SURFACE 21 | 1.00E+16 | 3.42 | |
| P22 | FLAT SURFACE | FLAT SURFACE | 0.70 | SILICON |
| | ASPHERICAL SURFACE 22 | 1.00E+16 | 0.83 | |
| S2 | FLAT SURFACE | — | 1.43 | |
| L22 | SPHERICAL SURFACE | 10.19 | 1.60 | SILICON |
| | SPHERICAL SURFACE | 9.44 | 2.87 | |
| L23 | SPHERICAL SURFACE | 17.60 | 1.40 | SILICON |
| | SPHERICAL SURFACE | 27.55 | 2.23 | |
| P23 | ASPHERICAL SURFACE 23 | 1.00E+16 | 0.20 | SILICON |
| | FLAT SURFACE | FLAT SURFACE | 2.00 | |
| CG2 | FLAT SURFACE | FLAT SURFACE | 1.00 | GERMANIUM |
| | FLAT SURFACE | FLAT SURFACE | 3.00 | |
| IM2 | | | | |

Table 6 shows aspherical shape data. The aspherical shape is represented by the expression (1).

TABLE 6

| | ASPHERICAL SURFACE 21 | ASPHERICAL SURFACE 22 | ASPHERICAL SURFACE 23 |
|---|---|---|---|
| PARAXIAL RADIUS OF CURVATURE R | 1.00E+18 | 1.00E+18 | 1.00E+18 |
| CONICAL COEFFICIENT k | 0.00 | 0.00 | 0 |
| 4TH-ORDER COEFFICIENT A | 4.19E−05 | 4.65E−05 | −0.00012 |
| 6TH-ORDER COEFFICIENT B | 2.50E−08 | 1.72E−07 | −1.04E−06 |
| 8TH-ORDER COEFFICIENT C | 1.63E−10 | 5.57E−09 | 1.02E−07 |
| 10TH-ORDER COEFFICIENT D | 6.34E−11 | 7.43E−11 | −3.42E−09 |
| 12TH-ORDER COEFFICIENT E | −9.48E−13 | 6.76E−13 | 5.33E−11 |
| 14TH-ORDER COEFFICIENT F | 6.30E−15 | 2.63E−15 | −3.01E−13 |

Figure 4:
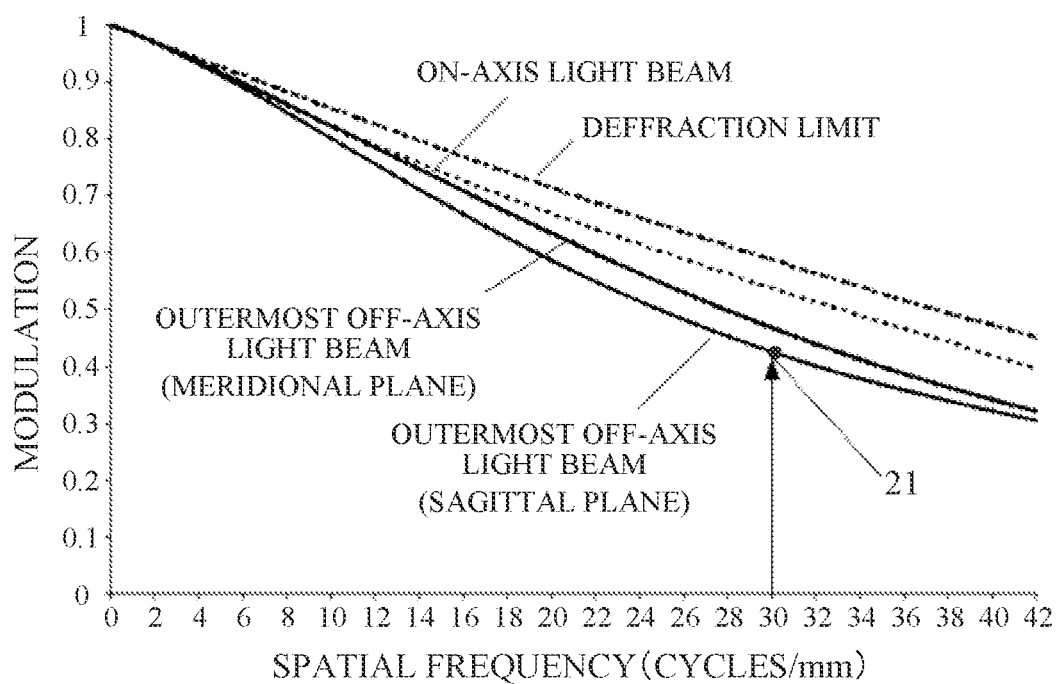
FIG. 4 is an MTF diagram of the optical system according to Example 2.

FIG. 4 is an MTF diagram of the optical system 200. This example uses the infrared sensor IM2 having a pixel pitch of 17 µm as an implementation. In this case, the Nyquist frequency is about 30 lp/mm. The MTF value at the Nyquist frequency in this example represented by reference numeral 21 in FIG. 4 is 43%. Since the MTF value is 30% or higher at the Nyquist frequency of the infrared sensor IM2, the optical system 200 exhibits excellent optical performance.

Example 3

Figure 5:
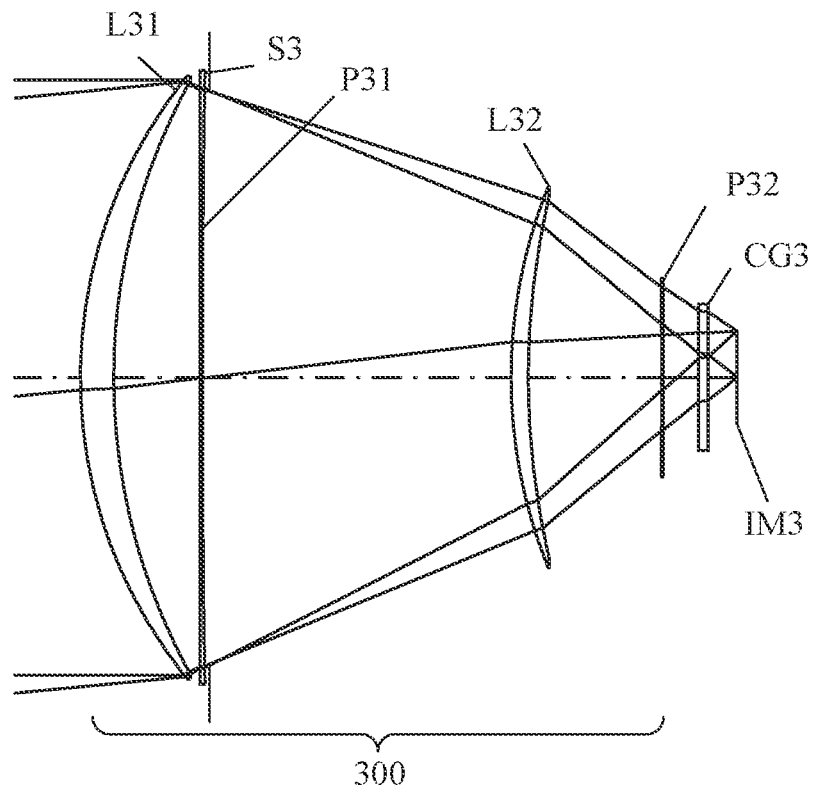
FIG. 5 is a sectional view of an optical system according to Example 3.

FIG. 5 is a sectional view of an optical system 300 according to this example. The optical system 300 is an infrared optical system having a focal length of 50 mm and an F-number of 0.8. The optical system 300 includes, in order from the object side to the image side, a first lens L31 made of a silicon material and having a positive refractive power, a thin aspherical plate P31 made of a silicon material and having an aspherical portion with a thickness that gradually increases from the center to the periphery, a diaphragm S3, a second lens L32 having a positive refractive power and made of a silicon material, and a thin aspherical plate P32 made of a silicon material and having an aspherical portion with a thickness that gradually increases from the center to the periphery. Therefore, it can be manufactured by easy processing such as a bending process used to manufacture the Schmidt correction plate. The thin aspherical plates P31 and P32 are assumed to have a very thin thickness of several hundred µm. Light in the infrared range guided by the optical system 300 passes through a cover glass CG3 and forms an image on an infrared sensor IM3. Table 7 shows numerical data of the optical system 300. The unit of radius of curvature and spacing is mm.

TABLE 7

| | | RADIUS OF CURVATURE | SPACING | GLASS MATERIAL |
|---|---|---|---|---|
| OBJECT PLANE | | — | INFINITY | |
| L31 | SPHERICAL SURFACE | 16.30 | 3.5 | SILICON |
| | SPHERICAL SURFACE | 17.91 | 9.0 | |
| P31 | FLAT SURFACE | FLAT SURFACE | 0.3 | SILICON |
| | ASPHERICAL SURFACE 31 | 1.00E+16 | 0.7 | |

TABLE 7-continued

|  | | RADIUS OF CURVATURE | SPACING | GLASS MATERIAL |
|---|---|---|---|---|
| S3 | FLAT SURFACE | FLAT SURFACE | 31.6 | |
| L32 | SPHERICAL SURFACE | 52.95227 | 1.8 | SILICON |
|  | SPHERICAL SURFACE | 82.412 | 14.0 | |
| P32 | ASPHERICAL SURFACE 32 | 1.00E+16 | 0.2 | SILICON |
|  | FLAT SURFACE | FLAT SURFACE | 3.7 | |
| CG3 | FLAT SURFACE | FLAT SURFACE | 1.0 | GERMANIUM |
|  | FLAT SURFACE | FLAT SURFACE | 3.0 | |
| IM3 | | | | |

Table 8 shows aspherical shape data. The aspherical shape is represented by the expression (1).

TABLE 8

|  | ASPHERICAL SURFACE 31 | ASPHERICAL SURFACE 32 |
|---|---|---|
| PARAXIAL RADIUS OF CURVATURE R | 1.00E+18 | 1.00E+18 |
| CONICAL COEFFICIENT k | 0.00 | 0.00 |
| 5TH-ORDER COEFFICIENT A | 3.27E−07 | −7.33E−06 |
| 6TH-ORDER COEFFICIENT B | −1.17E−10 | 3.85E−08 |
| 8TH-ORDER COEFFICIENT C | 4.20E−14 | 9.48E−11 |
| 10TH-ORDER COEFFICIENT D | 2.11E−17 | −1.46E−11 |
| 12TH-ORDER COEFFICIENT E | 6.93E−21 | 1.69E−13 |
| 14TH-ORDER COEFFICIENT F | 0.00E+00 | −5.85E−16 |

Figure 6:
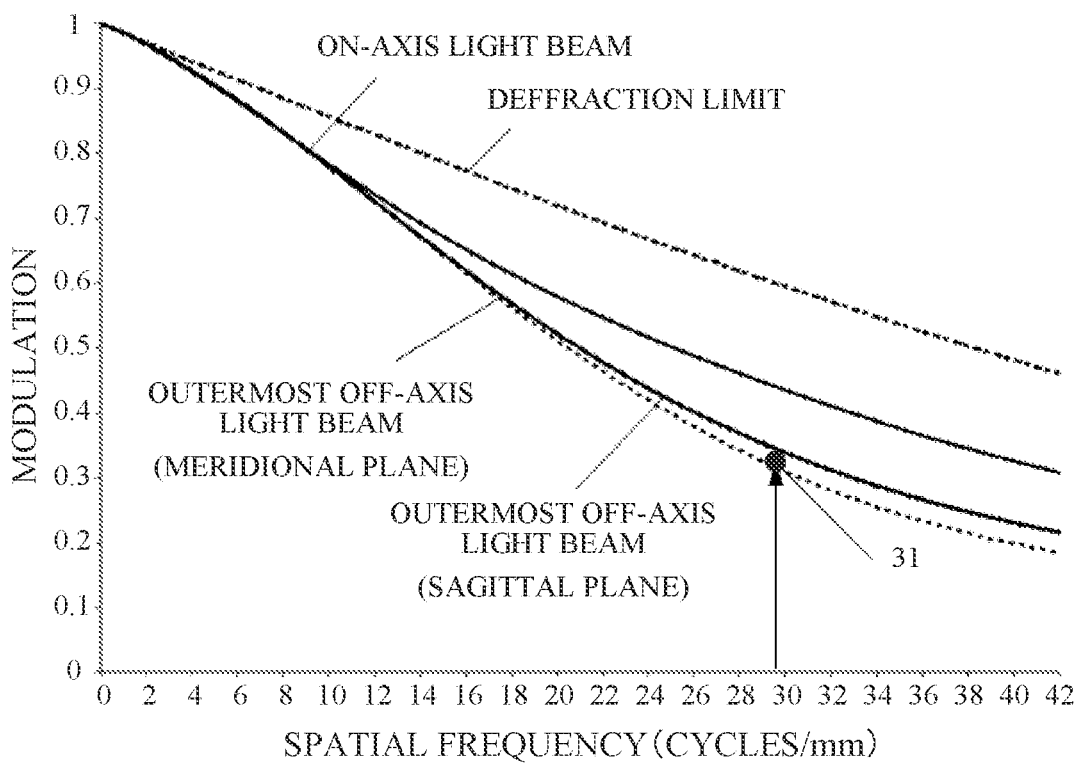
FIG. 6 is an MTF diagram of the optical system according to Example 3.

FIG. 6 is an MTF diagram of the optical system 300. This example uses the infrared sensor IM3 having a pixel pitch of 17 pin as an implementation. In this case, the Nyquist frequency is about 30 lp/mm. The MTF value at the Nyquist frequency of this example represented by reference numeral 31 in FIG. 6 is 32%. Since the MTF value is 30% or higher at the Nyquist frequency of the infrared sensor IM3, the optical system 300 exhibits excellent optical performance.

Example 4

Figure 7:
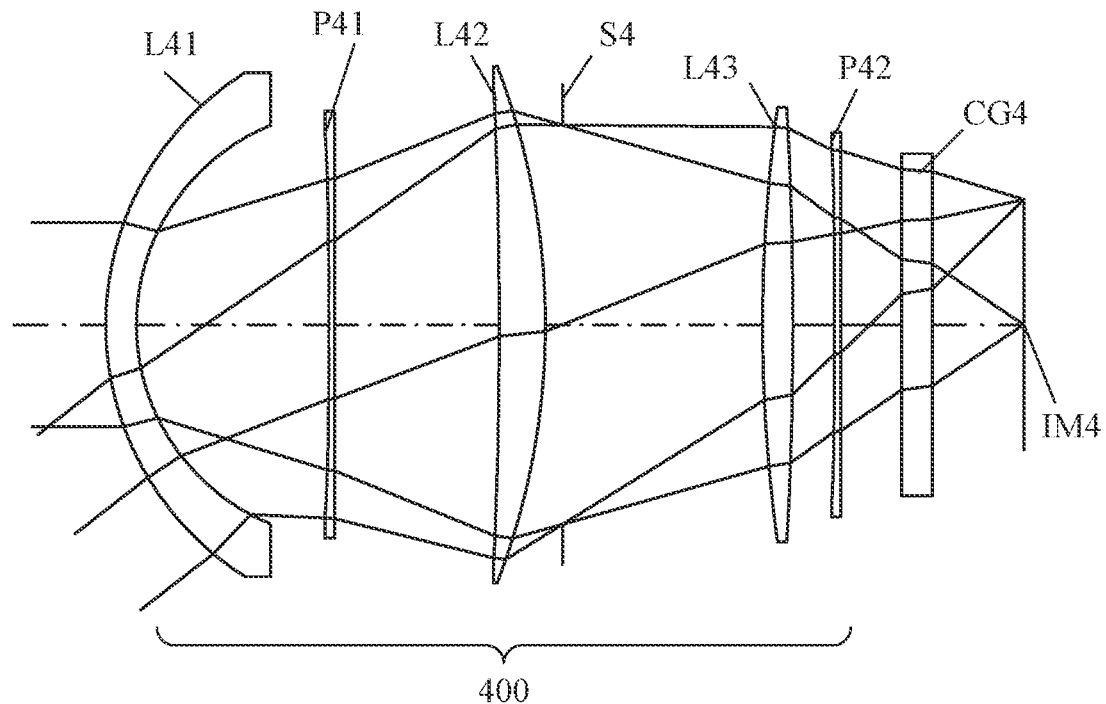
FIG. 7 is a sectional view of an optical system according to Example 4.

FIG. 7 is a sectional view of an optical system 400 according to this example. The optical system 400 is an infrared optical system having a focal length of 6 mm and an F-number of 0.9. The optical system 400 includes, in order from the object side to the image side, a first lens L41 having a negative refractive power and made of a silicon material, a thin aspherical plate P41 made of a silicon material and having an aspherical portion with a thickness that gradually increases from the center to the periphery, a second lens L42 having a positive refractive power and made of a silicon material, a diaphragm S4, a third lens L43 having a positive refractive power and made of a silicon material, and a thin aspherical plate P42 made of a silicon material and having an aspherical portion with a thickness that gradually increases from the center to the periphery. Therefore, it can be manufactured by easy processing such as a bending process used to manufacture the Schmidt correction plate. The thin aspherical plates P41 and P42 are assumed to have a very thin thickness of several hundred μm. Light in the infrared range guided by the optical system 400 passes through a cover glass CG4 and forms an image on an infrared sensor IM4. Table 9 shows numerical data of the optical system 400. The unit of radius of curvature and spacing is mm.

TABLE 9

|  | | RADIUS OF CURVATURE | SPACING | GLASS MATERIAL |
|---|---|---|---|---|
| OBJECT PLANE | | | INFINITY | |
| L41 | SPHERICAL SURFACE | 9.745272 | 1.0 | SILICON |
|  | SPHERICAL SURFACE | 7.033832 | 6.3 | |
| P41 | ASPHERICAL SURFACE 41 | 1249.747 | 0.2 | SILICON |
|  | FLAT SURFACE | FLAT SURFACE | 5.4 | |
| L42 | SPHERICAL SURFACE | −155.564 | 1.5 | SILICON |
|  | SPHERICAL SURFACE | −2.34E+01 | 0.6 | |
| S4 | FLAT SURFACE | FLAT SURFACE | 6.5 | |
| L43 | SPHERICAL SURFACE | 51.53527 | 1.0 | SILICON |
|  | FLAT SURFACE | −122.591 | 1.3 | |
| P42 | ASPHERICAL SURFACE 42 | 1200.627 | 0.2 | SILICON |
|  | FLAT SURFACE | FLAT SURFACE | 2.0 | |
| CG4 | FLAT SURFACE | FLAT SURFACE | 1.0 | GERMANIUM |
|  | FLAT SURFACE | FLAT SURFACE | 3.0 | |
| IM4 | | | | |

Table 10 shows aspherical shape data. The aspherical shape is represented by the expression (1).

TABLE 10

|  | ASPHERICAL SURFACE 41 | ASPHERICAL SURFACE 42 |
|---|---|---|
| PARAXIAL RADIUS OF CURVATURE R | 1.25E+03 | 1.20E+03 |
| CONICAL COEFFICIENT k | 0.00 | 0.00 |
| 4TH-ORDER COEFFICIENT A | −7.89E−05 | −7.80E−05 |
| 6TH-ORDER COEFFICIENT B | −2.17E−07 | −1.43E−06 |
| 8TH-ORDER COEFFICIENT C | −1.46E−08 | 1.44E−07 |
| 10TH-ORDER COEFFICIENT D | 5.68E−10 | −6.54E−09 |

TABLE 10-continued

| | ASPHERICAL SURFACE 41 | ASPHERICAL SURFACE 42 |
|---|---|---|
| 12TH-ORDER COEFFICIENT E | −8.71E−12 | 1.36E−10 |
| 14TH-ORDER COEFFICIENT F | 8.49E−14 | −1.10E−12 |

Figure 8:
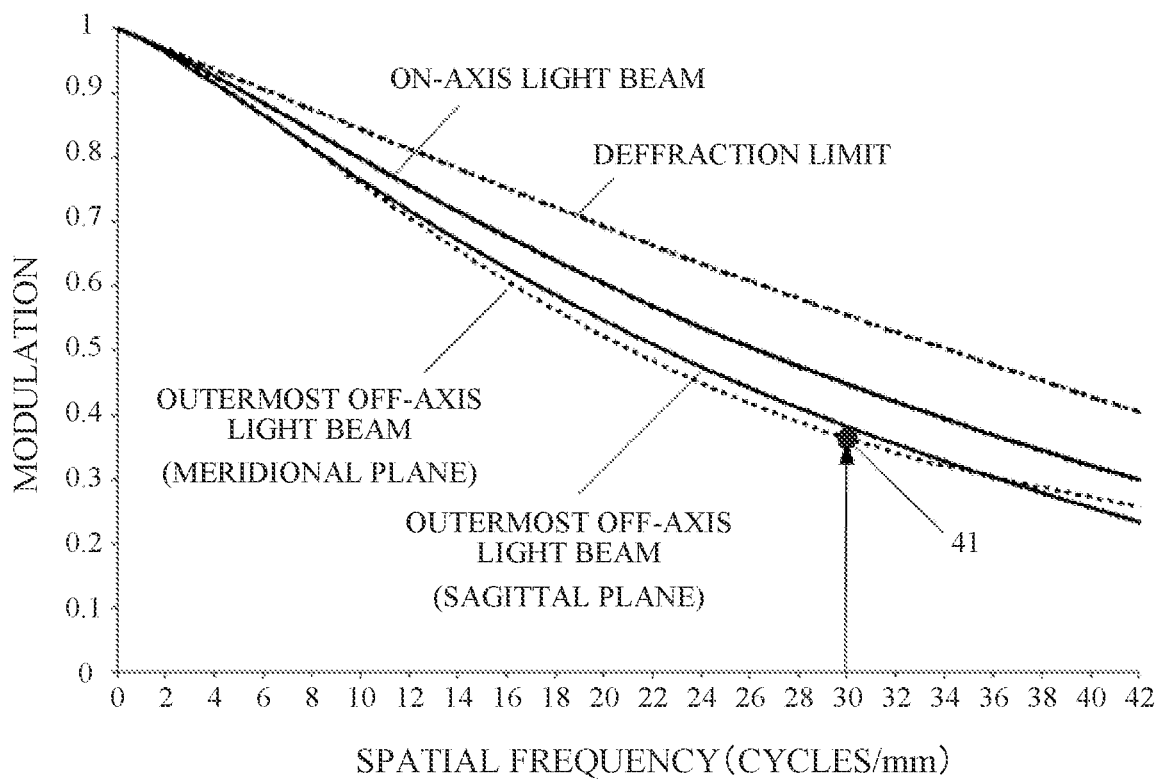
FIG. 8 is an MTF diagram of the optical system according to Example 4.

FIG. 8 is an MTF diagram of the optical system 400. This example uses the infrared sensor IM4 having a pixel pitch of 17 pin as an implementation. In this case, the Nyquist frequency is about 30 lp/mm. The MTF value at the Nyquist frequency in this example represented by reference numeral 41 in FIG. 8 is 36%. Since the MTF value is 30% or higher at the Nyquist frequency of the infrared sensor IM4, the optical system 400 exhibits excellent optical performance.

Example 5

Figure 9:
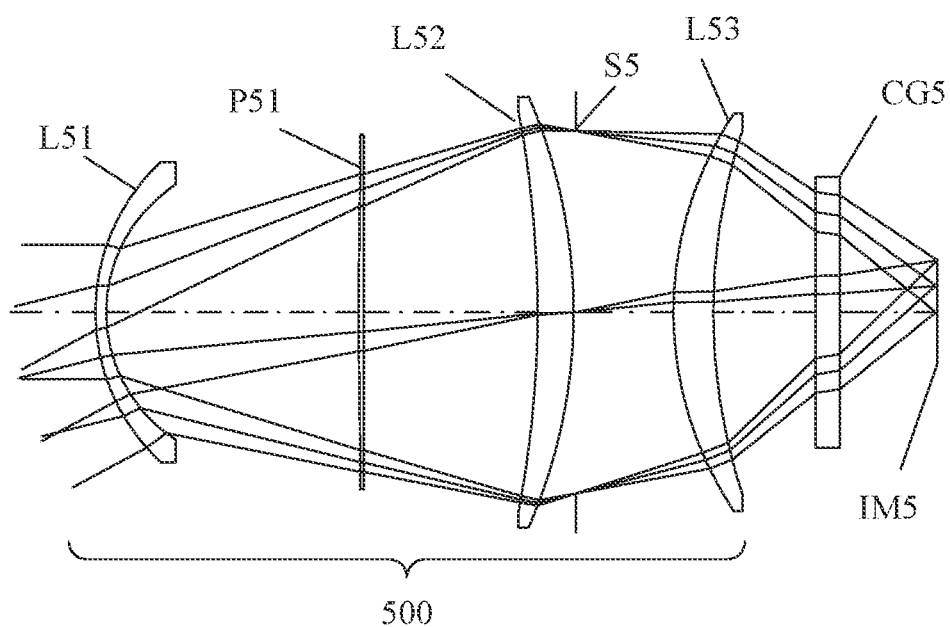
FIG. 9 is a sectional view of an optical system according to Example 5.

FIG. 9 is a sectional view of an optical system 500 according to this example. The optical system 500 is an infrared optical system having a focal length of 4.5 mm and an F-number of 0.8. The optical system 500 includes, in order from the object side to the image side, a first lens L51 having a negative refractive power and made of a silicon material, a thin aspherical plate P51 made of a silicon material and having an aspherical portion that is the thinnest between the center and the outermost periphery not inclusive (with a thickness that becomes the thinnest at a position other than an on-axis and an outermost off-axis (between the on-axis and the outermost off-axis not inclusive) in a section including the optical axis), a second lens L52 having a positive refractive power and made of a silicon material, a diaphragm S5, and a third lens L53 having a positive refractive power and made of a silicon material. The thin aspherical plates P51 and P52 are assumed to have a very thin thickness of several hundred μm. Therefore, it can be manufactured by easy processing such as a bending process used to manufacture the Schmidt correction plate. Light in the infrared range guided by the optical system 500 passes through a cover glass CG5 and forms an image on an infrared sensor IM5. Table 11 shows numerical data of the optical system 500. The unit of radius of curvature and spacing is mm.

Table 12 shows aspherical shape data. The aspherical shape is represented by the expression (1).

TABLE 12

| | ASPHERICAL SURFACE 51 |
|---|---|
| PARAXIAL RADIUS OF CURVATURE R | 1.96E+02 |
| CONICAL COEFFICIENT k | 0.00 |
| 4TH-ORDER COEFFICIENT A | −4.11E−05 |
| 6TH-ORDER COEFFICIENT B | 2.12E−07 |
| 8TH-ORDER COEFFICIENT C | 0.00E+00 |
| 10TH-ORDER COEFFICIENT D | 0.00E+00 |
| 12TH-ORDER COEFFICIENT E | 0.00E+00 |
| 14TH-ORDER COEFFICIENT F | 0.00E+00 |

Figure 10:
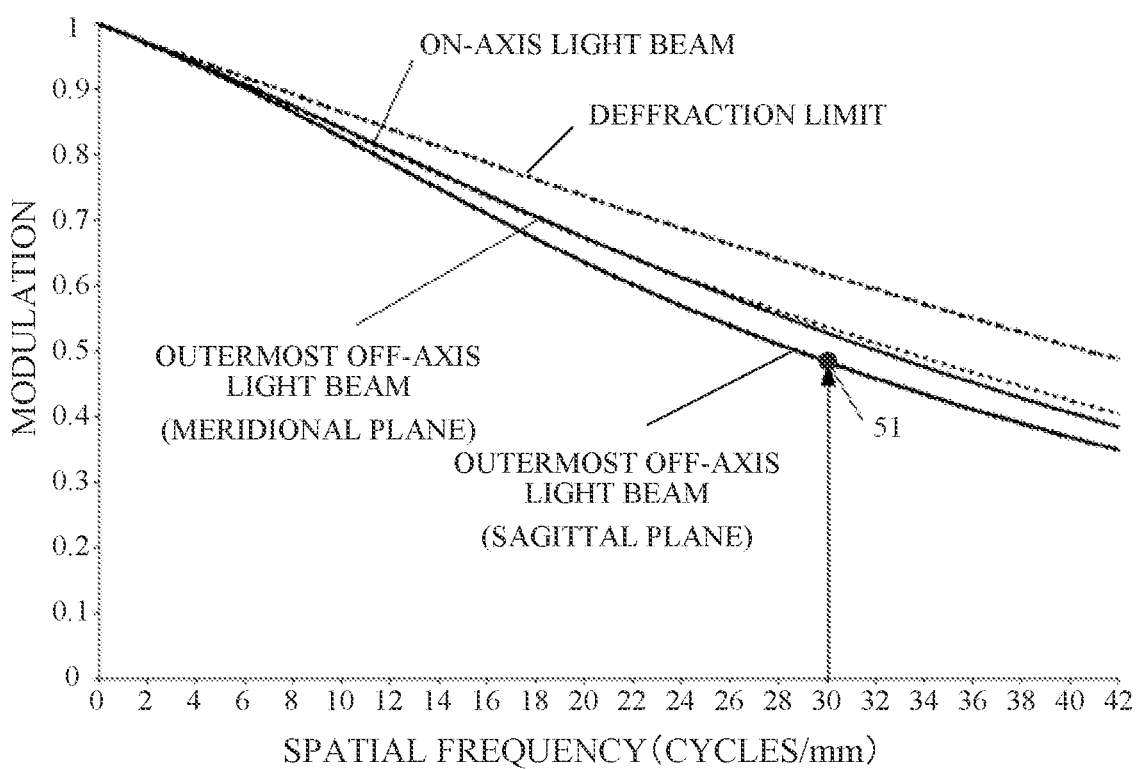
FIG. 10 is an MTF diagram of the optical system according to Example 5.

FIG. 10 is an MTF diagram of the optical system 500. This example uses the infrared sensor IM5 having a pixel pitch of 17 pin as an implementation. In this case, the Nyquist frequency is about 30 lp/mm. The MTF value at the Nyquist frequency in this example represented by reference numeral 51 in FIG. 10 is 48%. Since the MTF value is 30% or higher at the Nyquist frequency of the infrared sensor IM5, the optical system 500 exhibits excellent optical performance.

One method of correcting a curvature of field with high accuracy is a method of placing a thin aspherical plate having an aspherical effect at a position where light rays at respective angles of view are separated. The position where the light rays at respective angles of view are separated is different from the position of the diaphragm. Scattering of rays at respective angles of view is corrected by the aspherical surface portion. Since the curvature of field correction up to the fourth-order aspherical term is not enough, it is necessary to have an aspherical shape represented by a function having a sixth-order or higher aspherical term. It is necessary for the aberration correction that the shape has the thinnest thickness between the center and the outermost periphery (not inclusive).

The thin aspherical plate may be disposed at a position different from the position where the diaphragm is disposed from the viewpoint of curvature of field correction. The

TABLE 11

| | | RADIUS OF CURVATURE | SPACING | GLASS MATERIAL |
|---|---|---|---|---|
| OBJECT PLANE | | — | INFINITY | |
| L51 | SPHERICAL SURFACE | 8.63 | 0.45 | SILICON |
| | SPHERICAL SURFACE | 6.31 | 10.48 | |
| P51 | ASPHERICAL SURFACE ST | 196.43 | 0.20 | SILICON |
| | FLAT SURFACE | FLAT SURFACE | 7.22 | |
| L52 | SPHERICAL SURFACE | 4.39E−01 | 1.50 | SILICON |
| | SPHERICAL SURFACE | −22.31 | 0.10 | |
| S5 | FLATSURFACE | FLATSURFACE | 4.04 | |
| L53 | SPHERICAL SURFACE | 14.84 | 1.65 | SILICON |
| | SPHERICAL SURFACE | 24.16 | 2.26 | |
| | SPHERICAL SURFACE | FLAT SURFACE | 2.00 | |
| | FLAT SURFACE | FLAT SURFACE | 1.00 | GERMANIUM |
| CG5 | FLAT SURFACE | FLAT SURFACE | 2.00 | |
| | FLATSURFACE | FLAT SURFACE | 2.10 | |
| IM5 | | | | | following expression (10) may be satisfied when the thin aspherical plate is disposed on the object side of the diaphragm:

$$PZ/LP < 0.8 \quad (10)$$

where LP is a distance from the first lens to the diaphragm, and PZ is a distance from the diaphragm to the thin aspherical plate.

When the thin aspherical plate is disposed on the image side of the diaphragm, the following conditional expression (11) may be satisfied:

$$PZ/LS < 0.8 \quad (11)$$

where LS is a distance from the diaphragm to the image plane, and PZ is a distance from the diaphragm to the thin aspherical plate.

The numerical ranges of the conditional expressions (10) and (11) may be set to those of the following conditional expressions (10a) and (11a).

$$0.1 < PZ/LP < 0.7 \quad (10a)$$

$$0.1 < PZ/LS < 0.7 \quad (11a)$$

The optical systems according to Examples 5 to 8 may satisfy at least one of the following conditional expressions (12) to (14):

$$0.1 < |f1/f| < 5.0 \quad (12)$$

$$0.1 < f2/f < 10.0 \quad (13)$$

$$0.1 < f3/f < 10.0 \quad (14)$$

The conditional expressions (12) to (14) are set to the optical systems according to Examples 5 to 8 so as to satisfactorily correct various aberrations such as the chromatic aberration, the spherical aberration, and the curvature of field and to exhibit high optical performance. If the value is higher than the upper limit or lower than the lower limit in each of the conditional expressions (12) to (14), the correction balance between the curvature of field and the spherical aberration destroys, and the optical performance is deteriorated.

The numerical ranges of the conditional expressions (12) to (14) may be set to those of the following conditional expressions (12a) to (14a).

$$0.1 < |f1/f| < 3.5 \quad (12a)$$

$$0.1 < f2/f < 7.0 \quad (13a)$$

$$0.1 < f3/f < 4.0 \quad (14a)$$

Tables 13 and 14 show numerical values corresponding to the conditional expressions according to Examples 5 to 8.

TABLE 13

|  | f | f1 | f2 | f3 | Pf1 | f1/f | f2/f | f3/f | f/Pf |
|---|---|---|---|---|---|---|---|---|---|
| EX. 5 | 4.5 | −11.68 | 17.91 | 14.15 | 81.34 | −2.60 | 3.98 | 3.14 | 0.055 |
| EX. 6 | 4.5 | −10.34 | 16.23 | 13.47 | 72.62 | −2.30 | 3.61 | 2.99 | 0.062 |
| EX. 7 | 3 | −57.95 | 18.257 | 9.4242 | 31.166 | −1.93 | 6.09 | 3.14 | 0.096 |
| EX. 8 | 6 | −13.09 | 22.268 | 12.316 | 28.474 | −2.18 | 3.71 | 2.05 | 0.211 |

TABLE 14

|  | LP | LS | PZ | PZ/LP | PZ/LS | T |
|---|---|---|---|---|---|---|
| EX. 5 | 15.05 | 19.95 | 8381 | 0.59 | — | 0.20 |
| EX. 6 | 16.69 | 18.3 | 10.39 | — | 0.57 | 0.22 |
| EX. 7 | 7.23 | 19.73 | 12.01 | — | 0.61 | 0.33 |
| EX. 8 | 8.54 | 23.74 | 15.79 | — | 0.67 | 0.45 |

Example 6

Figure 11:
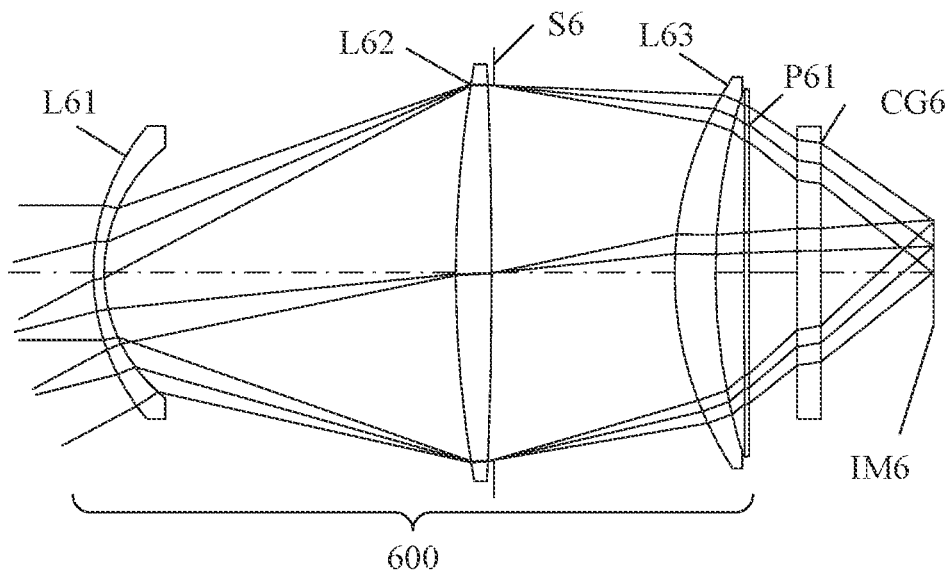
FIG. 11 is a sectional view of an optical system according to Example 6.

FIG. 11 is a sectional view of an optical system 600 according to this example. The optical system 600 is an infrared optical system having a focal length of 4.5 mm and an F-number of 0.8. The optical system 600 includes, in order from the object side to the image side, a first lens L61 made of a silicon material and having a negative refractive power, a second lens L62 made of a silicon material and having a positive refractive power, a diaphragm S6, a third lens L63 having a positive refractive power and made of a silicon material, and a thin aspherical plate P61 made of a silicon material and having an aspherical portion that is the thinnest between the center and the outermost periphery (not inclusive). Light in the infrared range guided by the optical system 600 passes through a cover glass CG6 and forms an image on an infrared sensor IM6. Table 15 shows numerical data of the optical system 600. The unit of radius of curvature and spacing is mm.

TABLE 15

|  |  | RADIUS OF CURVATURE | SPACING | GLASS MATERIAL |
|---|---|---|---|---|
| OBJECT PLANE |  | — | INFINITY |  |
| L61 | SPHERICAL SURFACE | 9.46 | 0.45 | SILICON |
|  | SPHERICAL SURFACE | 6.63 | 14.65 |  |
| L62 | SPHERICAL SURFACE | 49.33 | 1.50 | SILICON |
|  | SPHERICAL SURFACE | −186.71 | 0.10 |  |
| S6 | FLAT SURFACE | FLAT SURFACE | 7.51 |  |
| L63 | SPHERICAL SURFACE | 14.94 | 1.70 | SILICON |
|  | SPHERICAL SURFACE | 25.41 | 1.18 |  |
| P61 | ASPHERICAL SURFACE 61 | 175.36 | 0.22 | SILICON |
|  | SPHERICAL SURFACE | FLAT SURFACE | 2.00 |  |

TABLE 15-continued

|  |  | RADIUS OF CURVATURE | SPACING | GLASS MATERIAL |
|---|---|---|---|---|
| CG6 | FLAT SURFACE | FLAT SURFACE | 1.00 | GERMANIUM |
|  | FLAT SURFACE | FLAT SURFACE | 4.68 |  |
| IM6 |  | — | — |  |

Table 16 shows aspherical shape data. The aspherical shape is represented by the expression (1).

TABLE 16

|  | ASPHERICAL SURFACE 61 |
|---|---|
| PARAXIAL RADIUS OF CURVATURE R | 175.359 |
| CONICAL COEFFICIENT k | 0.00 |
| 4TH-ORDER COEFFICIENT A | −6.07E−05 |
| 6TH-ORDER COEFFICIENT B | 3.43E−07 |
| 8TH-ORDER COEFFICIENT C | 0.00E+00 |
| 10TH-ORDER COEFFICIENT D | 0.00E+00 |
| 12TH-ORDER COEFFICIENT E | 0.00E+00 |
| 14TH-ORDER COEFFICIENT F | 0.00E+00 |

Figure 12:
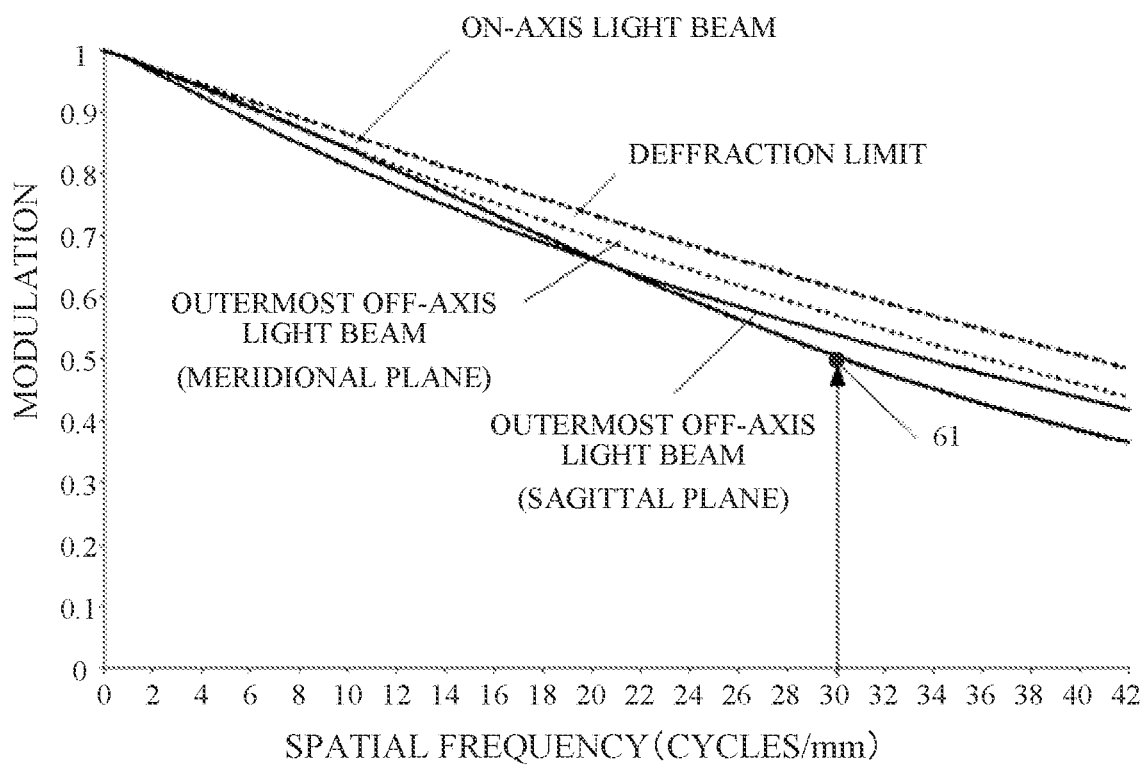
FIG. 12 is an MTF diagram of the optical system according to Example 6.

FIG. 12 is an MTF diagram of an optical system 600. In this example, an infrared sensor IM6 having a pixel pitch of 17 μm is used as an example. In this case, the Nyquist frequency is about 30 lp/mm. The MTF value at the Nyquist frequency of this example represented by reference numeral 61 in FIG. 12 is 50%. Since the MTF value is 30% or higher at the Nyquist frequency of the infrared sensor IM6, the optical system 600 exhibits excellent optical performance.

Example 7

Figure 13:
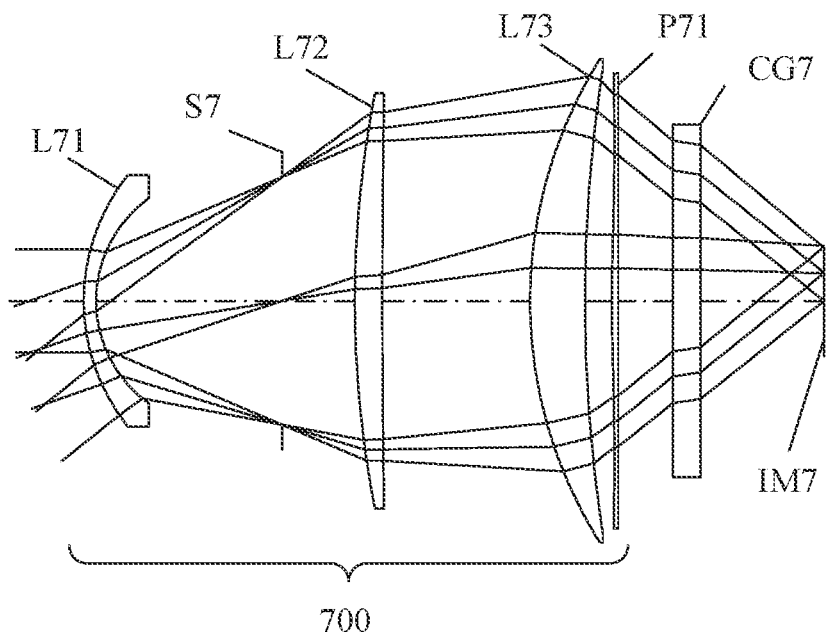
FIG. 13 is a sectional view of an optical system according to Example 7.

FIG. 13 is a sectional view of an optical system 700 according to this example. The optical system 700 is an infrared optical system having a focal length of 3 mm and an F-number of 0.8. The optical system 700 includes, in order from the object side to the image side, a first lens L71 having a negative refractive power and made of a silicon material, a diaphragm S7, a second lens L72 having a positive refractive power and made of a silicon material, a third lens L73 having a positive refractive power and made of a silicon material, and a thin aspherical plate P71 made of a silicon material and having an aspherical portion that is the thinnest between the center and the outermost periphery (not inclusive). Light in the infrared range guided by the optical system 700 passes through a cover glass CG7 and forms an image on an infrared sensor IM7. Table 17 shows numerical data of the optical system 700. The unit of radius of curvature and spacing is mm.

TABLE 17

|  |  | RADIUS OF CURVATURE | SPACING | GLASS MATERIAL |
|---|---|---|---|---|
| OBJECT PLANE |  | — | INFINITY |  |
| L71 | SPHERICAL SURFACE | 9.72 | 0.45 | SILICON |
|  | SPHERICAL SURFACE | 7.43 | 10.05 |  |
| S7 | SPHERICAL SURFACE | FLAT SURFACE | 0.10 |  |

TABLE 17-continued

|  |  | RADIUS OF CURVATURE | SPACING | GLASS MATERIAL |
|---|---|---|---|---|
| L72 | SPHERICAL SURFACE | 19.87 | 1.00 | SILICON |
|  | FLAT SURFACE | 28.08 | 8.70 |  |
| L73 | SPHERICAL SURFACE | 15.16 | 2.00 | SILICON |
|  | SPHERICAL SURFACE | 29.26 | 2.62 |  |
| P71 | ASPHERICAL SURFACE 71 | 83.69 | 0.22 | SILICON |
|  | SPHERICAL SURFACE | FLAT SURFACE | 2.00 |  |
| CG7 | FLAT SURFACE | FLAT SURFACE | 1.00 | GERMANIUM |
|  | FLAT SURFACE | FLAT SURFACE | 4.50 |  |
| IM7 |  | — | — |  |

Table 18 shows aspherical shape data. The aspherical shape is represented by the expression (1).

TABLE 18

|  | ASPHERICAL SURFACE 71 |
|---|---|
| PARAXIAL RADIUS OF CURVATURE R | 75.259 |
| CONICAL COEFFICIENT k | 0.00 |
| 4TH-ORDER COEFFICIENT A | −1.35E−04 |
| 6TH-ORDER COEFFICIENT B | 6.62E−07 |
| 8TH-ORDER COEFFICIENT C | 0.00E+00 |
| 10TH-ORDER COEFFICIENT D | 0.00E+00 |
| 12TH-ORDER COEFFICIENT E | 0.00E+00 |
| 14TH-ORDER COEFFICIENT F | 0.00E+00 |

Figure 14:
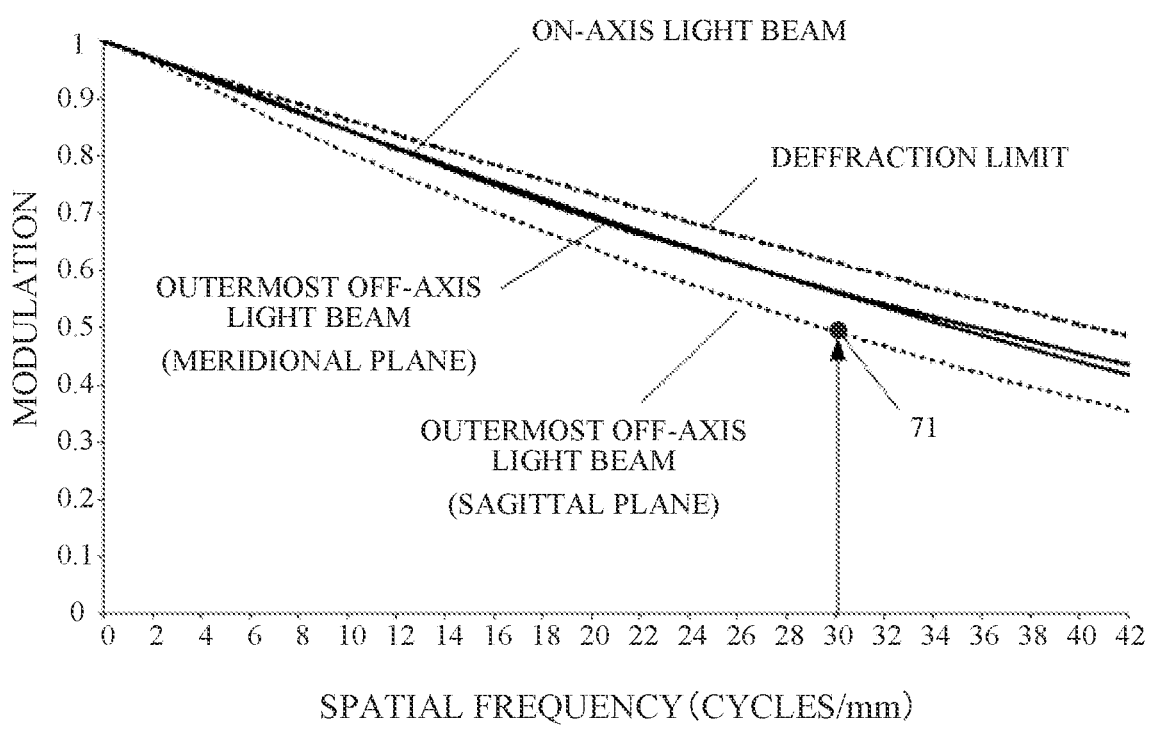
FIG. 14 is an MTF diagram of the optical system according to Example 7.

FIG. 14 is an MTF diagram of the optical system 700. This example uses the infrared sensor IM7 having a pixel pitch of 17 μm as an implementation. In this case, the Nyquist frequency is about 30 lp/mm. The MTF value at the Nyquist frequency in this example represented by reference numeral 71 in FIG. 14 is 49%. Since the MTF value is 30% or higher at the Nyquist frequency of the infrared sensor IM7, the optical system 700 exhibits excellent optical performance.

Example 8

Figure 15:
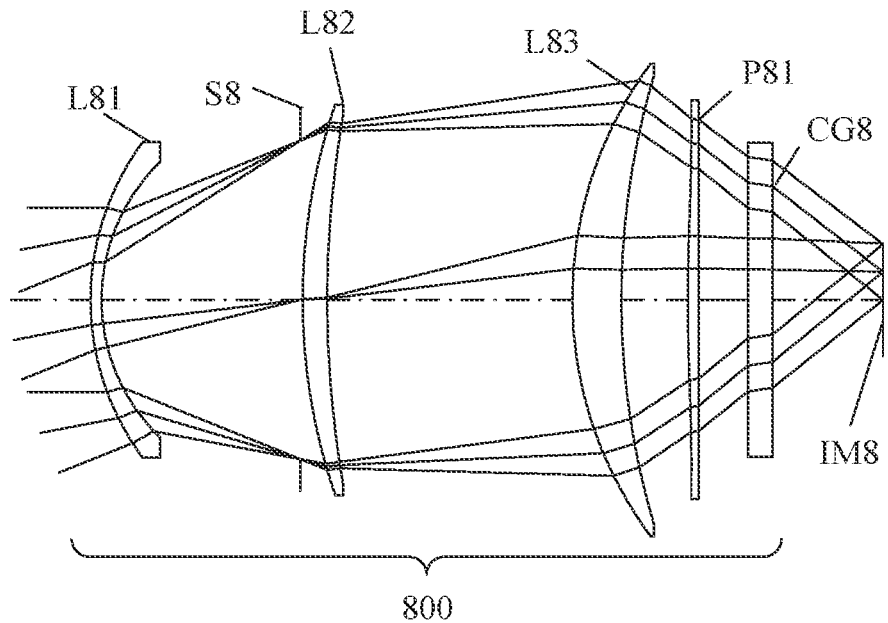
FIG. 15 is a sectional view of an optical system according to Example 8.

FIG. 15 is a sectional view of an optical system 800 according to this example. The optical system 800 is an infrared optical system having a focal length of 6 mm and an F-number of 0.8. The optical system 800 includes, in order from the object side to the image side, a first lens L81 having a negative refractive power and made of a silicon material, a diaphragm S8, a second lens L82 having a positive refractive power and made of a silicon material, a third lens L83 having a positive refractive power and made of a silicon material, and a thin aspherical plate P81 made of a silicon material and having an aspherical portion that is the thinnest between the center and the outermost periphery (not inclusive). Light in the infrared range guided by the optical system 800 passes through a cover glass CG8 and forms an image on an infrared sensor IM8. Table 19 shows numerical data of the optical system 800. The unit of radius of curvature and spacing is mm.

TABLE 19

| | | RADIUS OF CURVATURE | SPACING | GLASS MATERIAL |
|---|---|---|---|---|
| OBJECT PLANE | | — | INFINITY | |
| L81 | SPHERICAL SURFACE | 10.79 | 0.45 | SILICON |
| | SPHERICAL SURFACE | 7.81 | 8.09 | |
| S8 | SPHERICAL SURFACE | FLAT SURFACE | 0.10 | |
| L82 | SPHERICAL SURFACE | 24.50 | 1.00 | SILICON |
| | FLAT SURFACE | 43.71 | 9.98 | |
| L83 | SPHERICAL SURFACE | 16.13 | 2.00 | SILICON |
| | SPHERICAL SURFACE | 32.18 | 2.71 | |
| P81 | ASPHERICAL SURFACE 81 | 68.76 | 0.45 | SILICON |
| | SPHERICAL SURFACE | FLAT SURFACE | 2.00 | |
| CG8 | FLAT SURFACE | FLAT SURFACE | 1.00 | GERMANIUM |
| | PLAT SURFACE | FLAT SURFACE | 4.50 | |
| IM8 | | — | — | |

Table 20 shows aspherical shape data. The aspherical shape is represented by the expression (1).

TABLE 20

| | ASPHERICAL SURFACE 81 |
|---|---|
| PARAXIAL RADIUS OF CURVATURE R | 68.759 |
| CONICAL COEFFICIENT k | 0.00 |
| 4TH-ORDER COEFFICIENT A | −1.02E−04 |
| 6TH-ORDER COEFFICIENT B | 3.50E−07 |
| 8TH-ORDER COEFFICIENT C | 0.00E+00 |
| 10TH-ORDER COEFFICIENT D | 0.00E+00 |
| 12TH-ORDER COEFFICIENT E | 0.00E+00 |
| 14TH-ORDER COEFFICIENT F | 0.00E+00 |

Figure 16:
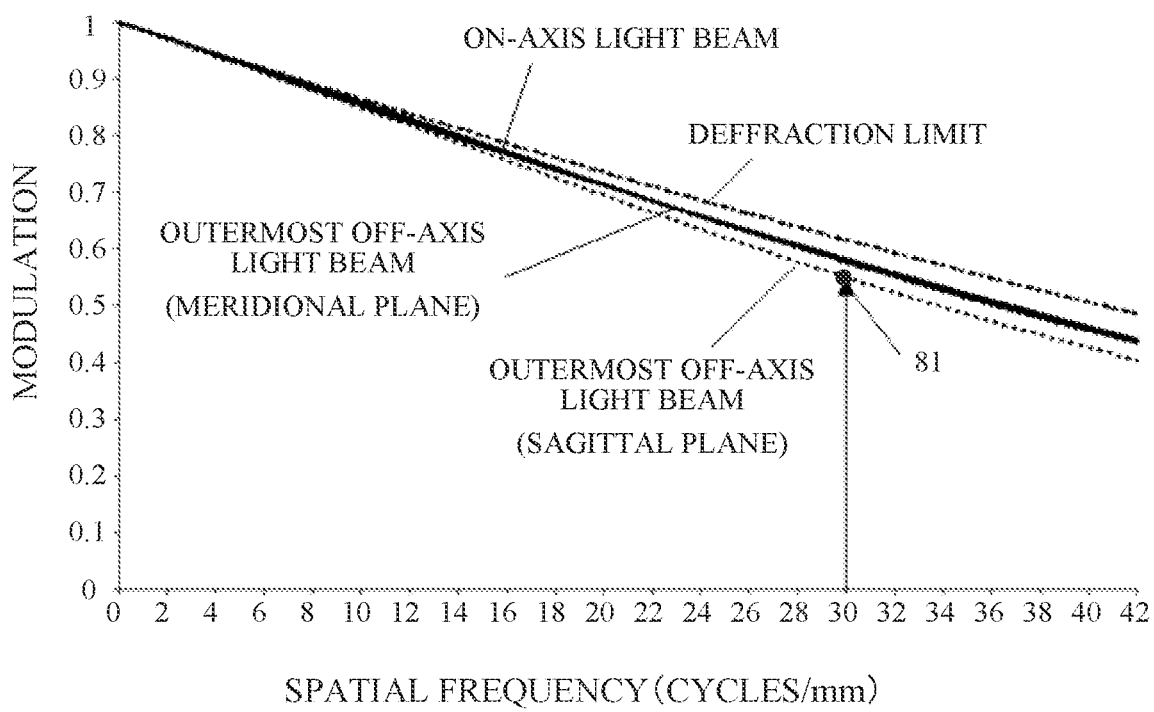
FIG. 16 is an MTF diagram of the optical system according to Example 8.

FIG. 16 is an MTF diagram of an optical system 800. This example uses the infrared sensor IM8 having a pixel pitch of 17 μm as an implementation. In this case, the Nyquist frequency is about 30 lp/mm. The MTF value at the Nyquist frequency in this example represented by reference numeral 81 in FIG. 16 is 54%. Since the MTF value is 30% or higher at the Nyquist frequency of the infrared sensor IM8, the optical system 800 exhibits excellent optical performance.

Example 9

Figure 17:
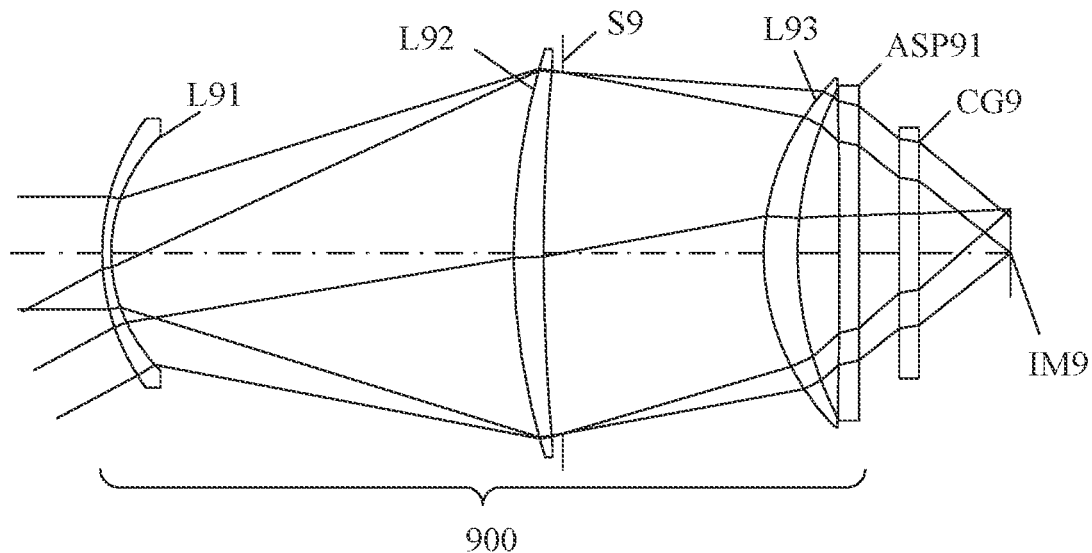
FIG. 17 is a sectional view of an optical system according to Example 9.

FIG. 17 is a sectional view of an optical system 900 according to this example. The optical system 900 is an infrared optical system having a focal length of 4.5 mm and an F-number of 0.8. The optical system 900 includes, in order from the object side to the image side, a first lens L91 having a negative refractive power and made of a germanium material, a second lens L92 having a positive refractive power and made of a silicon material, a diaphragm S9, a third lens L93 having a positive refractive power and made of a silicon material, and an optical element (aspherical lens) ASP91 having an aspherical surface and made of a chalcogenide material. Chalcogenide contains a compound using an oxygen group element of Group 16 in the periodic table, and the refractive index and Abbe number change depending on the type of the compound. In this example, IRG206 of NHG (Hubei New Huagung Information Materials Co., Ltd.) is used as chalcogenide, but the compound is not limited to this example as long as it is a compound using an oxygen group element of Group 16 in the periodic table. Light in the infrared range guided by the optical system 800 passes through a cover glass CG9 and forms an image on an infrared sensor IM9. Table 21 shows numerical data of the optical system 900. The unit of radius of curvature and spacing is mm.

TABLE 21

| | RADIUS OF CURVATURE | SPACING | GLASS MATERIAL |
|---|---|---|---|
| OBJECT PLANE | — | INFINITY | |
| L91 | 11.4429 | 0.45 | GERMANIUM |
| | 8.208534 | 20.08 | |
| L92 | 33.64908 | 1.50 | SILICON |
| | 103.3151 | 0.96 | |
| S9 | FLAT SURFACE | 10.01 | |
| L93 | 12.39436 | 1.70 | SILICON |
| | 17.8448 | 2.07 | |
| ASP91(ASPHERICAL SURFACE 91) | 358.0504 | 1.00 | CALCOGENIDE |
| | FLAT SURFACE | 2.00 | |
| CG9 | FLAT SURFACE | 1.00 | GERMANIUM |
| | FLAT SURFACE | 4.56 | |
| IM9 | — | | |

Table 22 shows aspherical shape data. The aspherical shape is represented by the expression (1).

TABLE 22

| | ASPHERICAL SURFACE 91 |
|---|---|
| PARAXIAL RADIUS OF CURVATURE R | 358.050 |
| CONICAL COEFFICIENT k | 0.00 |
| 4TH-ORDER COEFFICIENT A | −1.05E−04 |
| 6TH-ORDER COEFFICIENT B | 2.95E−06 |
| 8TH-ORDER COEFFICIENT C | −1.13E−07 |
| 10TH-ORDER COEFFICIENT D | 3.21E−09 |
| 12TH-ORDER COEFFICIENT B | −4.79E−11 |
| 14TH-ORDER COEFFICIENT F | 2.81E−13 |

Figure 18:
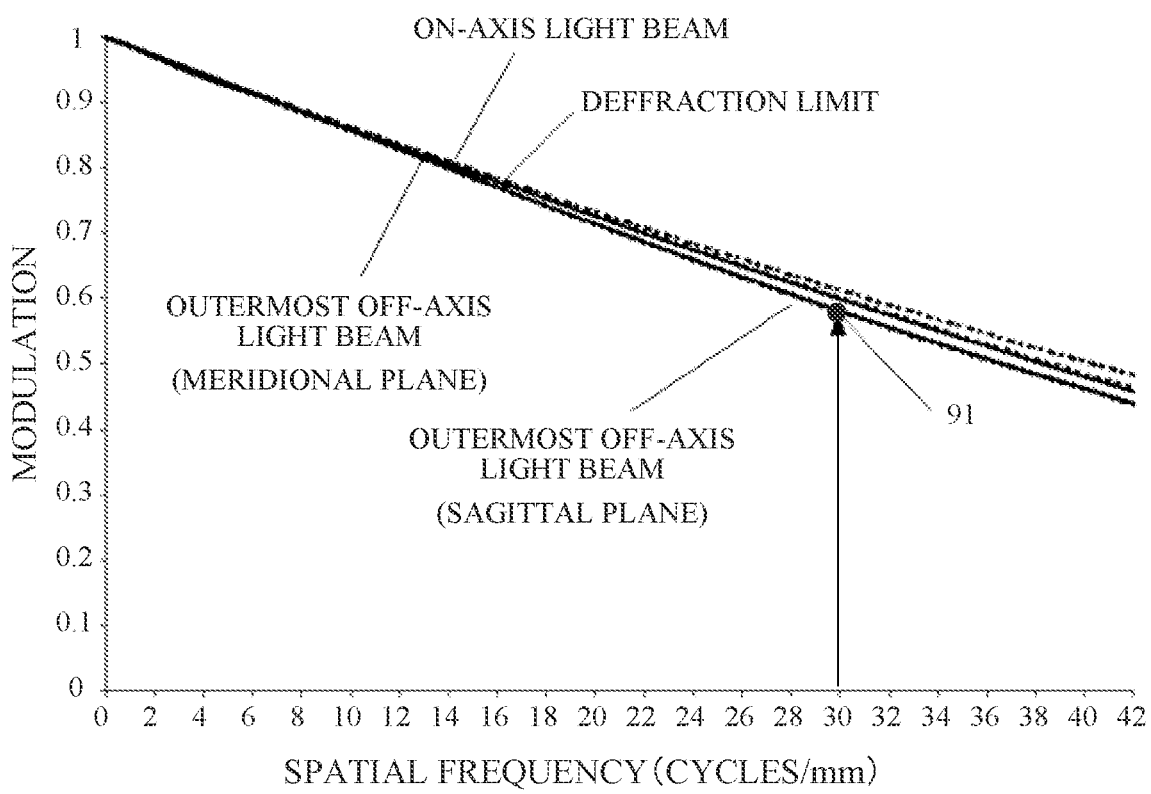
FIG. 18 is an MTF diagram of the optical system according to Example 9.

FIG. 18 is an MTF diagram of the optical system 900. This example uses the infrared sensor IM9 having a pixel pitch of 17 pin as an implementation. In this case, the Nyquist frequency is about 30 lp/mm. The MTF value at the Nyquist frequency in this example represented by reference numeral 91 in FIG. 18 is 57%. Since the MTF value is 30% or higher at the Nyquist frequency of the infrared sensor IM9, the optical system 900 exhibits excellent optical performance.

Silicon materials and germanium materials each have a high refractive index and a low dispersion in the infrared range and can exhibit high optical performance using an aspherical surface used for part of the lens made of silicon material or germanium material. However, in order to process an optical element having an aspherical surface of a silicon material or a germanium material, a highly difficult process such as grinding or polishing is required.

On the other hand, chalcogenide, zinc selenium (ZnSe), zinc sulfide (ZnS), resin (high density polyethylene) and the like are materials that can be molded by heat or the like, but exhibits a large chromatic aberration amount due to a large dispersion. If a diffraction structure is provided on the lens surface in order to correct the chromatic aberration, unnecessary light may be incident on the infrared sensor due to scattering in the diffraction structure, which may deteriorate the optical performance.

A lens usually has a positive Abbe number, and thus at least one lens may have a negative focal distance in order to reduce the chromatic aberration. Using materials with a large dispersion such as chalcogenide, zinc selenium, zinc sulfide, and resin (high density polyethylene) can suppress the chromatic aberration by increasing the focal distance of the lens (or by reducing the refractive power).

One method of correcting the curvature of field with high accuracy is a method of placing an optical element having an aspherical surface at a position where light rays of respective angles of view are separated. In an attempt to mainly correct the curvature of field, it is effective to dispose an aspherical lens on the image side. When such a moldable material as chalcogenide, zinc selenide, zinc sulfide, and resin (high density polyethylene) is used for the aspherical lens, the chromatic aberration becomes a problem. In order to solve this problem, an aspherical lens having a long focal length is used in this example.

Thus, this example can improve optical performance by disposing the optical element having an aspherical surface with a small refractive power at a position different from that of the diaphragm. The optical element having an aspherical surface may satisfy the conditional expression of $20 \leq \nu 10 \leq 2000$. In order to improve the ease of manufacturing (molding and processing) an optical element having an aspherical surface, the optical element may be made of a material having a large dispersion. More specifically, the optical element having an aspherical surface may satisfy the conditional expression of $20 \leq \nu 10 \leq 800$.

Compared to aspherical lenses, aspherical lenses using materials with large dispersion need to suppress the chromatic aberration while giving only the action of the aspherical part as an effect. Therefore, the following expression (15) may be satisfied:

$$0.0 < |f/Pf2| < 0.3 \quad (15)$$

where Pf2 is a focal length of the aspherical lens.

The numerical range of the conditional expression (15) may be set to that of the following conditional expression (15a).

$$0.0 < |f/Pf2| < 0.1 \quad (15a)$$

The numerical range of the conditional expression (15) may be set to that of the following conditional expression (15b).

$$0.00 < |f/Pf2| < 0.07 \quad (15b)$$

The aspherical lens using a material having a large dispersion may be disposed on the image side of the diaphragm from the viewpoint of the curvature of field correction. The following expression (16) may be satisfied:

$$0.3 < PZ/LS < 1.0 \quad (16)$$

where PZ is a distance from the diaphragm to the aspherical lens.

The numerical range of the conditional expression (16) may be set to that of the following conditional expression (16a).

$$0.4 < PZ/LS < 0.9 \quad (16a)$$

The optical systems according to Examples 9 to 12 may satisfy at least one of the following conditional expressions (17) to (19).

$$0.01 < |f1/Pf2| < 0.80 \quad (17)$$

$$0.01 < |f2/Pf2| < 0.80 \quad (18)$$

$$0.01 < |f3/Pf2| < 0.80 \quad (19)$$

The conditional expressions (17) to (19) are set to the optical systems according to Examples 9 to 12 so as to satisfactorily correct various aberrations such as the chromatic aberration, the spherical aberration, and the curvature of field and to exhibit high optical performance. If the value is higher than the upper limit or lower than the lower limit in each of the conditional expressions (17) to (19), the correction balance between the curvature of field and the spherical aberration destroys, and the optical performance is deteriorated.

The numerical ranges of the conditional expressions (17) to (19) may be set to those of the following conditional expressions (17a) to (19a).

$$0.01 < |f1/Pf2| < 0.50 \quad (17a)$$

$$0.01 < |f2/Pf2| < 0.50 \quad (18a)$$

$$0.01 < |f3/Pf2| < 0.50 \quad (19a)$$

Tables 23 and 24 show numerical values corresponding to the conditional expressions according to Examples 9 to 12.

TABLE 23

|        | f   | f1     | f2     | f3     | Pf     | f1/f  | f2/f | f3/f | f/Pf  |
|--------|-----|--------|--------|--------|--------|-------|------|------|-------|
| EX. 9  | 4.5 | −9.95  | 18.15  | 13.60  | 80.16  | −2.21 | 4.03 | 3.02 | 0.050 |
| EX. 10 | 4.5 | −10.24 | 17.92  | 13.54  | 130.83 | −2.28 | 3.98 | 3.01 | 0.034 |
| EX. 11 | 4.5 | −9.834 | 17.78  | 13.538 | 140.82 | −2.19 | 3.95 | 3.01 | 0.032 |
| EX. 12 | 4.5 | −10.66 | 17.884 | 13.547 | 203.53 | −2.37 | 3.97 | 3.01 | 0.022 |

TABLE 24

|        | LS    | PZ    | PZ/LS |
|--------|-------|-------|-------|
| EX. 9  | 22.34 | 13.78 | 0.62  |
| EX. 10 | 21.05 | 12.54 | 0.60  |
| EX. 11 | 21.45 | 12.74 | 0.59  |
| EX. 12 | 20.4  | 12.24 | 0.60  |

Example 10

Figure 19:
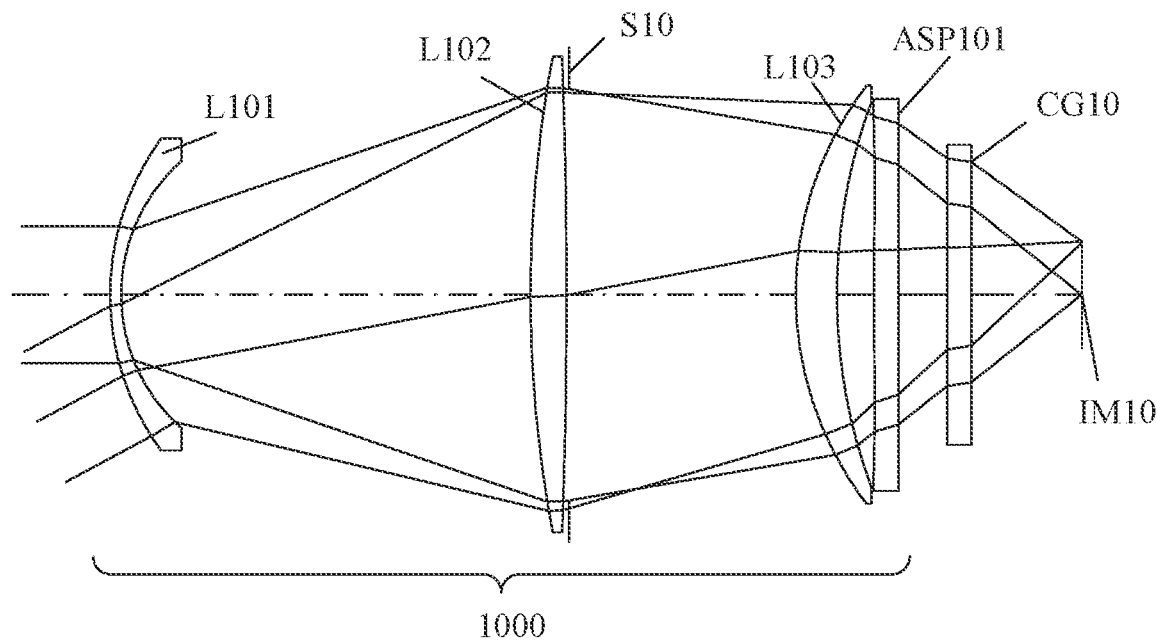
FIG. 19 is a sectional view of an optical system according to Example 10.

FIG. 19 is a sectional view of an optical system 1000 according to this example. The optical system 1000 is an infrared optical system having a focal length of 4.5 mm and an F-number of 0.8. The optical system 1000 includes, in order from the object side to the image side, a first lens L101 having a negative refractive power and made of a silicon material, a second lens L102 having a positive refractive power and made of a silicon material, a diaphragm S10, a third lens L103 having a positive refractive power and made of a silicon material, and an optical element (aspherical lens) ASP101 having an aspherical surface and made of a zinc sulfide material. Light in the infrared range guided by the optical system 1000 passes through a cover glass CG10 and forms an image on an infrared sensor IM10. Table 25 shows numerical data of the optical system 1000. The unit of radius of curvature and spacing is mm.

TABLE 25

|  | RADIUS OF CURVATURE | SPACING | GLASS MATERIAL |
|---|---|---|---|
| OBJECT PLANE | — | INFINITY |  |
| L101 | 10.8801 | 0.45 | SILICON |
|  | 7.33552 | 16.85 |  |
| L102 | 52.42293 | 1.50 | SILICON |
|  | −242.625 | 0.10 |  |
| S10 | FLAT SURFACE | 9.32 |  |
| L103 | 14.17181 | 1.70 | SILICON |
|  | 22.89453 | 1.53 |  |
| ASP101(ASPHERICAL SURFACE 101) | 151.7479 | 1.00 | ZINC SULFIDE |
|  | 1.73E+04 | 2.00 |  |
| CG10 | FLAT SURFACE | 1.00 | GERMANIUM |
|  | FLAT SURFACE | 4.56 |  |
| IM10 | — |  |  |

Table 26 shows aspherical shape data. The aspherical shape is represented by the expression (1).

TABLE 26

|  | ASPHERICAL SURFACE 101 |
|---|---|
| PARAXIAL RADIUS OF CURVATURE R | 151.748 |
| CONICAL COEFFICIENT k | 0.00 |
| 4TH-ORDER COEFFICIENT A | −1.34E−04 |
| 6TH-ORDER COEFFICIENT B | 4.16E−06 |
| 8TH-ORDER COEFFICIENT C | −1.68E−07 |
| 10TH-ORDER COEFFICIENT D | 4.26E−09 |
| 12TH-ORDER COEFFICIENT E | −5.50E−11 |
| 14TH-ORDER COEFFICIENT F | 2.81E−13 |

Figure 20:
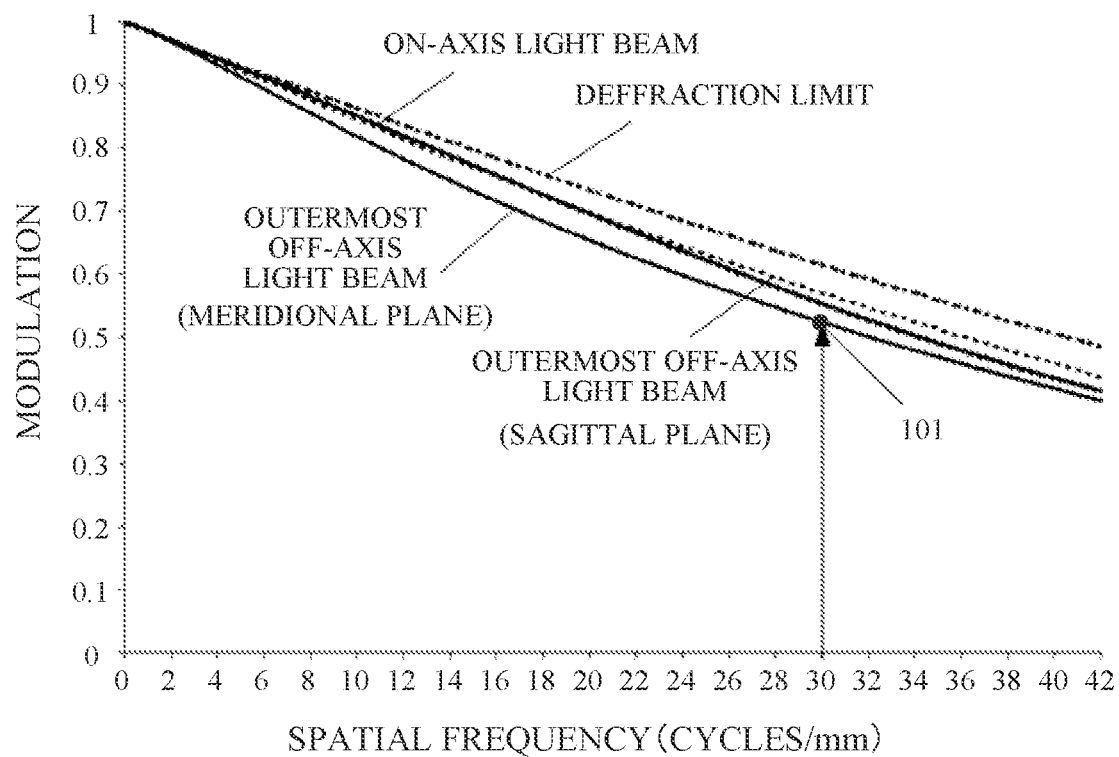
FIG. 20 is an MTF diagram of the optical system according to Example 10.

FIG. 20 is an MTF diagram of the optical system 1000. This example uses the infrared sensor IM10 having a pixel pitch of 17 μm as an implementation. In this case, the Nyquist frequency is about 30 lp/mm. The MTF value at the Nyquist frequency in this example represented by reference numeral 101 in FIG. 20 is 52%. Since the MTF value is 30% or higher at the Nyquist frequency of the infrared sensor IM10, the optical system 1000 exhibits excellent optical performance.

Example 11

Figure 21:
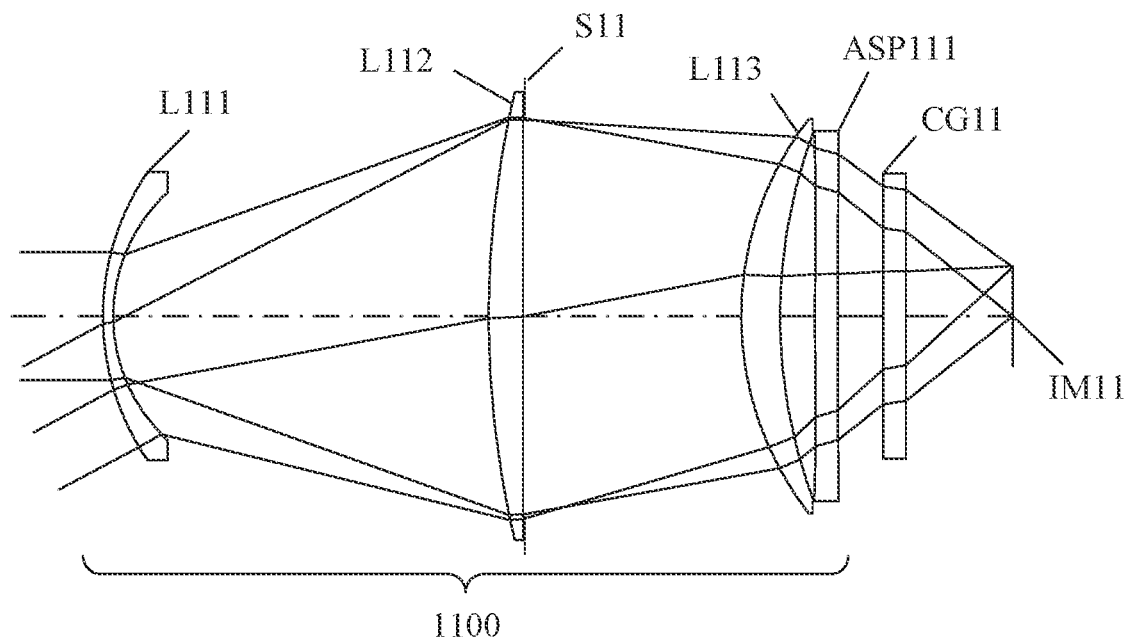
FIG. 21 is a sectional view of an optical system according to Example 11.

FIG. 21 is a sectional view of an optical system 1100 according to this example. The optical system 1100 is an infrared optical system having a focal length of 4.5 mm and an F-number of 0.8. The optical system 1100 includes, in order from the object side to the image side, a first lens L111 having a negative refractive power and made of a silicon material, a second lens L112 having a positive refractive power and made of a silicon material, a diaphragm S11, a third lens L113 having a positive refractive power and made of a silicon material, and an optical element (aspherical lens) lens ASP111 having an aspherical surface and made of a zinc selenium material. Light in the infrared range guided by the optical system 1100 passes through a cover glass CG11 and forms an image on an infrared sensor IM11. Table 27 shows numerical data of the optical system 1100. The unit of radius of curvature and spacing is mm.

TABLE 27

|  | RADIUS OF CURVATURE | SPACING | GLASS MATERIAL |
|---|---|---|---|
| OBJECT PLANE | — | INFINITY |  |
| L111 | 11.24434 | 0.45 | SILICON |
|  | 7.41501 | 16.50 |  |
| L112 | 42.69496 | 1.50 | SILICON |
|  | 7444.902 | 0.10 |  |
| S11 | FLAT SURFACE | 9.50 |  |
| L113 | 14.16753 | 1.70 | SILICON |
|  | 22.88135 | 1.54 |  |
| ASP111(ASPHERICAL SURFACE 111) | 154.7086 | 1.00 | ZINC SELENIDE |
|  | 7.29E+02 | 2.00 |  |
| CG11 | FLAT SURFACE | 1.00 | GERMANIUM |
|  | FLAT SURFACE | 4.70 |  |
| IM11 | — |  |  |

Table 28 shows aspherical shape data. The aspherical shape is represented by the expression (1).

TABLE 28

|  | ASPHERICAL SURFACE 111 |
|---|---|
| PARAXIAL RADIUS OF CURVATURE R | 154.709 |
| CONICAL COEFFICIENT k | 0.00 |
| 4TH-ORDER COEFFICIENT A | −1.23E−04 |
| 6TH-ORDER COEFFICIENT B | 3.58E−06 |
| 8TH-ORDER COEFFICIENT C | −1.48E−07 |
| 10TH-ORDER COEFFICIENT D | 3.92E−09 |
| 12TH-ORDER COEFFICIENT E | −5.29E−11 |
| 14TH-ORDER COEFFICIENT F | 2.81E−13 |

Figure 22:
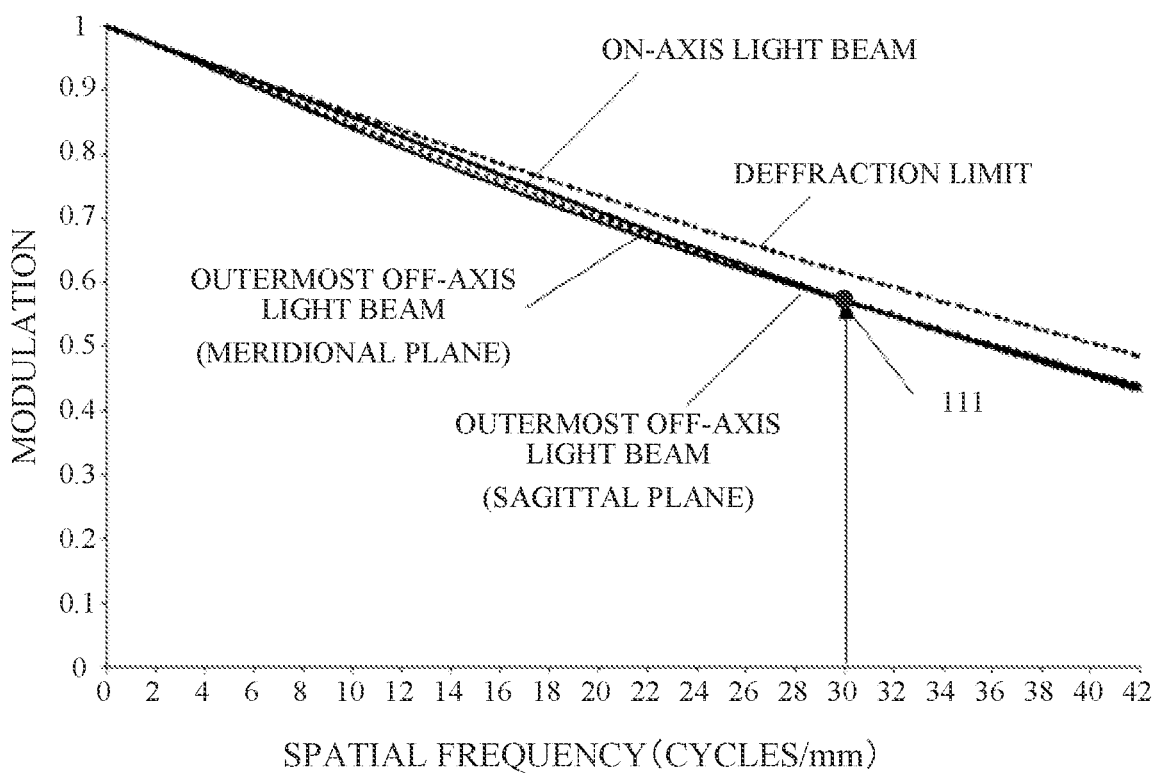
FIG. 22 is an MTF diagram of the optical system according to Example 11.

FIG. 22 is an MTF diagram of the optical system 1100. This example uses the infrared sensor IM10 having a pixel pitch of 17 μm as an implementation. In this case, the Nyquist frequency is about 30 lp/mm. The MTF value at the Nyquist frequency in this example represented by reference numeral 111 in FIG. 22 is 57%. Since the MTF value is 30% or higher at the Nyquist frequency of the infrared sensor IM10, the optical system 1100 exhibits excellent optical performance.

Example 12

Figure 23:
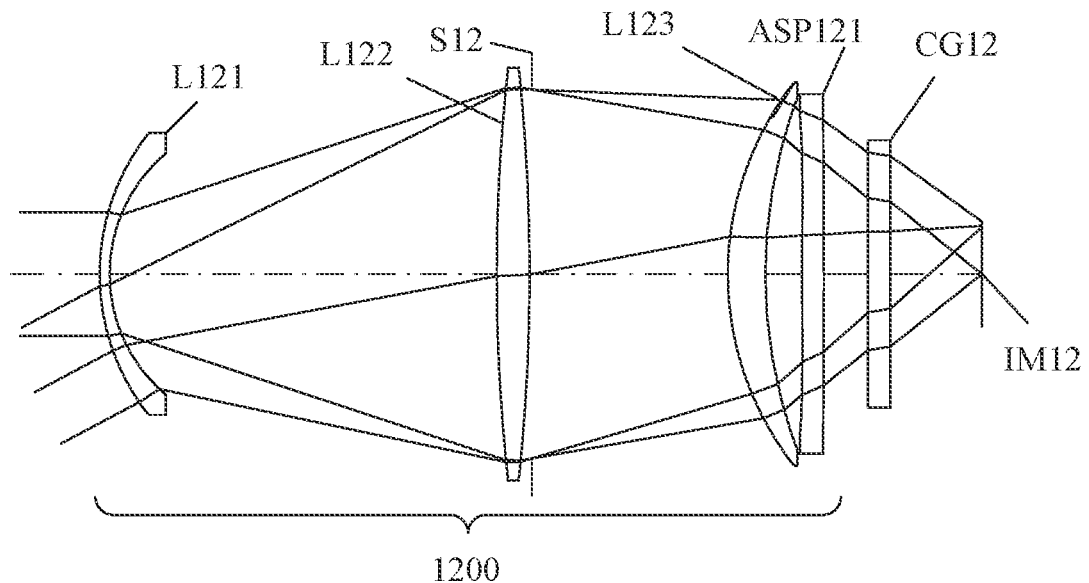
FIG. 23 is a sectional view of an optical system according to Example 12.

FIG. 23 is a sectional view of an optical system 1200 according to this example. The optical system 1200 is an infrared optical system having a focal length of 4.5 mm and an F-number of 0.8. The optical system 1200 includes, in order from the object side to the image side, a first lens L121 having a negative refractive power and made of a silicon material, a second lens L122 having a positive refractive power and made of a silicon material, a diaphragm S12, a third lens L123 having a positive refractive power and made of a silicon material, and an optical element (aspherical lens) ASP121 having an aspherical surface made of a resin material. A resin material amount includes high-density polyethylene (HDPE), which is polyethylene having a density of 0.942 [kg/m 3] or higher. Light in the infrared range guided by the optical system 1200 passes through a cover glass CG12 and forms an image on an infrared sensor IM12. Table 29 shows numerical data of the optical system 1200. The unit of radius of curvature and spacing is mm.

TABLE 29

|  | RADIUS OF CURVATURE | SPACING | GLASS MATERIAL |
| --- | --- | --- | --- |
| OBJECT PLANE | — | INFINITY |  |
| L121 | 10.34174 | 0.45 | SILICON |
|  | 7.150503 | 17.55 |  |
| L122 | 83.9322 | 1.50 | SILICON |
|  | −87.8344 | 0.10 |  |
| S12 | FLAT SURFACE | 8.88 |  |
| L123 | 14.08102 | 1.70 | SILICON |
|  | 22.61232 | 1.66 |  |
| ASP121(ASPHERICAL SURFACE 121) | 120.1702 | 1.00 | RESIN |
|  | −7.64E+02 | 2.00 |  |
| CG12 | FLAT SURFACE | 1.00 | GERMANIUM |
|  | FLAT SURFACE | 4.16 |  |
| IM12 |  | — |  |

Table 30 shows aspherical shape data. The aspherical shape is represented by the expression (1).

TABLE 30

|  | ASPHERICAL SURFACE 121 |
| --- | --- |
| PARAXIAL RADIUS OF CURVATURE R | 120.170 |
| CONICAL COEFFICIENT k | 0.00 |
| 4TH-ORDER COEFFICIENT A | −2.77E−04 |
| 6TH-ORDER COEFFICIENT B | 1.14E−05 |
| 8TH-ORDER COEFFICIENT C | −4.22E−07 |
| 10TH-ORDER COEFFICIENT D | 8.76E−09 |
| 12TH-ORDER COEFFICIENT B | −8.50E−11 |
| 14TH-ORDER COEFFICIENT F | 2.81E−13 |

Figure 24:
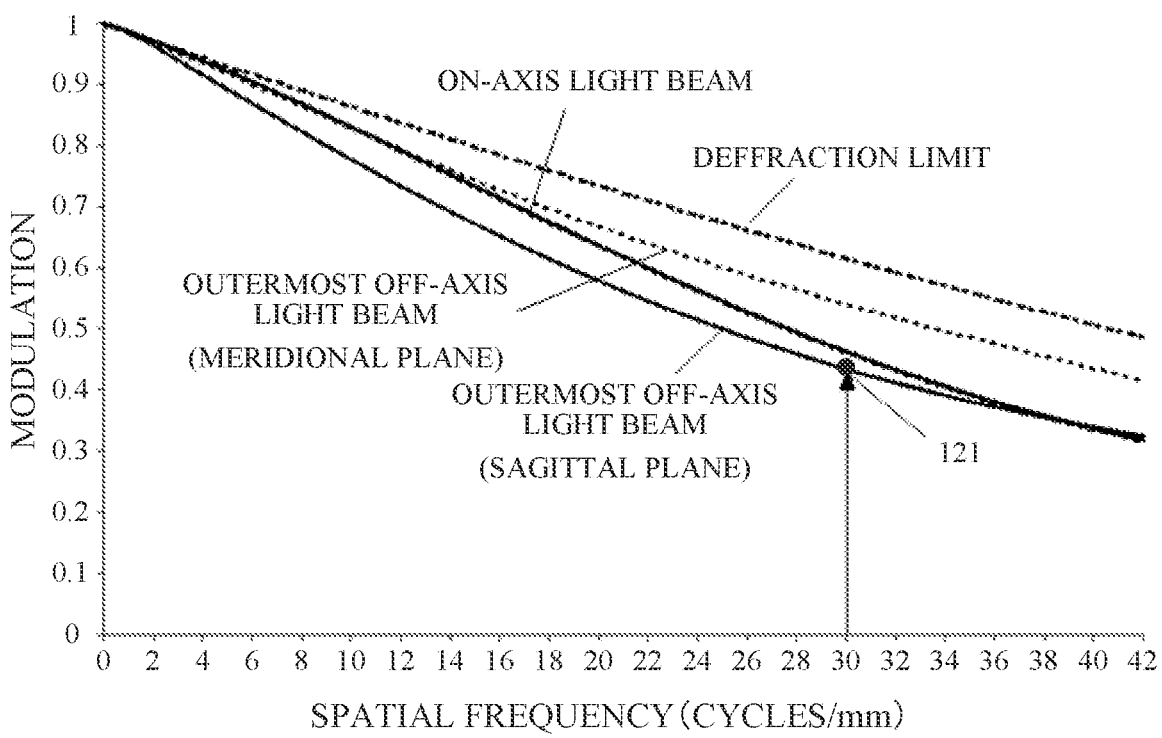
FIG. 24 is an MTF diagram of the optical system according to Example 12.
Figure 25:
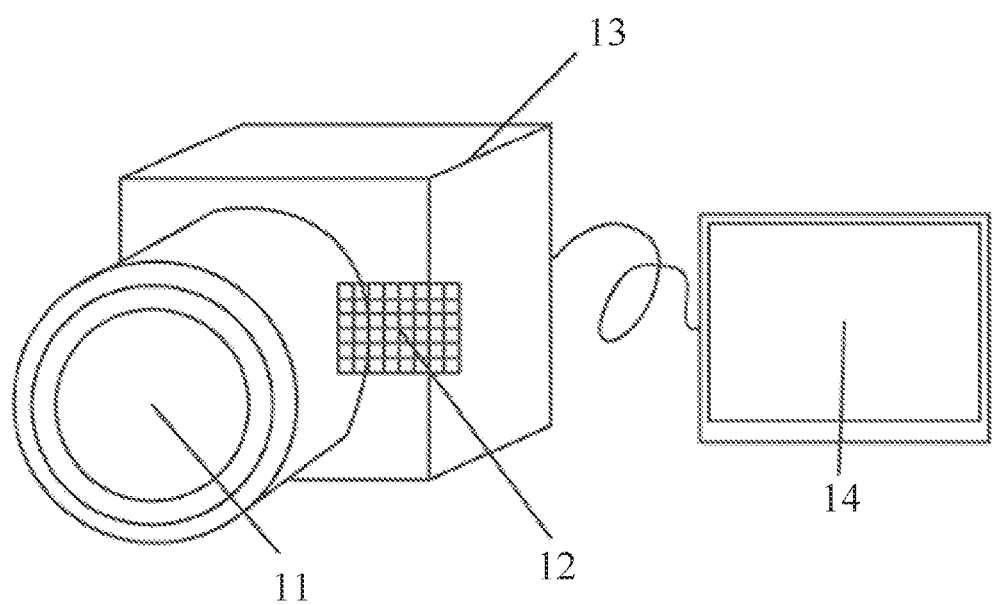
FIG. 25 is a schematic view of principal part of a camcorder as an illustrative image pickup apparatus according to Example 13.

FIG. 24 is an MTF diagram of the optical system 1200. This example uses the infrared sensor IM7 having a pixel pitch of 17 μm as an implementation. In this case, the Nyquist frequency is about 30 lp/mm. The MTF value at the Nyquist frequency in this example represented by reference numeral 121 in FIG. 24 is 43%. Since the MTF value is 30% or higher at the Nyquist frequency of the infrared sensor IM12, the optical system 1200 exhibits excellent optical performance.

Example 13

In this example, an infrared camcorder (video camera) is an illustrative image pickup apparatus using the optical system according to each example. FIG. is a schematic view of principal part of the camcorder according to this example. The camcorder has an imaging optical system 11 including a camera body 13 and an optical system according to any one of Examples 1 to 12. The camera body 13 includes an image sensor (infrared sensor) 12 such as a microbolometer that receives (photoelectrically converts) an object image formed by the imaging optical system 11. The infrared sensor can use, for example, one formed by using vanadium oxide or amorphous silicon. An acquired image can be confirmed on a display device 14. The display device 14 may be incorporated into the camera body 13 or may be separated from but communicable with the camera body 13 via wireless communications. The optical system according to each example is applicable to an image pickup apparatus such as an in-vehicle camera or a surveillance camera.

Each example can provide an optical system having high optical performance in the infrared range and easy to manufacture, and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-108208, filed on Jun. 23, 2020, which is hereby incorporated by reference herein in its entirety.

What is claimed is:

1. An optical system configured to image an object with light with a wavelength of 8 μm or longer, the optical system comprising:
a first lens having a negative refractive power;
a second lens having a positive refractive power and closer to an image plane than the first lens;
a third lens having a positive refractive power and closer to the image plane than the second lens;
a diaphragm; and
an optical element having an aspherical surface and disposed at a position different from that of the diaphragm,
wherein in a section including an optical axis, a thickness of the optical element is minimum at a position other than an on-axis and an outermost off-axis, and
wherein the following conditional expression is satisfied:

$0.0 < |f/Pf1| < 0.3$ where f is a focal length of the optical system, and Pf1 is a focal length of the optical element;
wherein the following conditional expression is satisfied:

$0.1 < |f1/f| < 5.0$ where f1 is a focal length of the first lens.

2. The optical system according to claim 1, wherein the aspherical surface has a shape represented by a function of a sixth order or longer.

3. The optical system according to claim 1, wherein the optical element is disposed on an object side of the diaphragm, and
wherein the following conditional expression is satisfied:

$PZ/LP < 0.8$ where PZ is a distance from the diaphragm to the optical element, and LP is a distance from the diaphragm to the first lens.

4. The optical system according to claim 1, wherein the optical element is closer to the image plane than the diaphragm, and
wherein the following conditional expression is satisfied:

$PZ/LS < 0.8$ where PZ is a distance from the diaphragm to the optical element, and LS is a distance from the diaphragm to the image plane.

5. The optical system according to claim 1, wherein the following conditional expression is satisfied:

$0.1 < f2/f < 10.0$ where f2 is a focal length of the second lens.

6. The optical system according to claim 1, wherein the following conditional expression is satisfied:

$0.05 \leq T \leq 1.00$ where T [mm] is a thickness of the optical element on an optical axis.

7. The optical system according to claim 1, wherein the optical element is closer to the image plane than the diaphragm, and
wherein the following conditional expression is satisfied:

$$0.3 < PZ/LS < 1.0$$

where PZ is a distance from the diaphragm to the optical element, and LS is a distance from the diaphragm to the image plane.

8. The optical system according to claim 1, wherein the following conditional expression is satisfied:

$$0.01 < |f1/Pf1| < 0.80$$

where f1 is a focal length of the first lens.

9. The optical system according to claim 1, wherein the following conditional expression is satisfied:

$$0.01 < f2/Pf1 < 0.80$$

where f2 is a focal length of the second lens.

10. The optical system according to claim 1, wherein the following conditional expression is satisfied:

$$0.1 < f3/Pf1 < 0.80$$

where f3 is a focal length of the third lens.

11. The optical system according to claim 1, wherein the optical element is made of a silicon material.

12. The optical system according to claim 1, each of the first lens, the second lens, and third lens is made of a silicon material or a germanium material.

13. An image pickup apparatus comprising:
the optical system according to claim 1; and
an image sensor configured to receive light from the optical system.

14. An optical system configured to image an object with light with a wavelength of 8 μm or longer, the optical system comprising:
a first lens having a negative refractive power;
a second lens having a positive refractive power and closer to an image plane than the first lens;
a third lens having a positive refractive power and closer to the image plane than the second lens;
a diaphragm; and
an optical element having an aspherical surface and disposed at a position different from that of the diaphragm,
wherein in a section including an optical axis, a thickness of the optical element is minimum at a position other than an on-axis and an outermost off-axis, and
wherein the following conditional expression is satisfied:

$$0.0 < |f/Pf1| < 0.3$$

where f is a focal length of the optical system, and Pf1 is a focal length of the optical element, and
wherein the following conditional expression is satisfied:

$$0.1 < f3/f < 10.0$$

where f3 is a focal length of the third lens.

15. An image pickup apparatus comprising:
the optical system according to claim 14; and
an image sensor configured to receive light from the optical system.

* * * * *